United States Patent
Hattori et al.

(10) Patent No.: US 6,839,597 B2
(45) Date of Patent: Jan. 4, 2005

(54) STATE-OF-DEVICE REMOTE MONITORING SYSTEM

(75) Inventors: Takayuki Hattori, Tokyo (JP); Ikuo Ikeda, Tokyo (JP); Riichiro Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 226 days.

(21) Appl. No.: 10/076,068

(22) Filed: Feb. 15, 2002

(65) Prior Publication Data

US 2003/0045946 A1 Mar. 6, 2003

(30) Foreign Application Priority Data

Aug. 29, 2001 (JP) ........................................ 2001-259863

(51) Int. Cl.[7] ............................................. G05B 11/01
(52) U.S. Cl. ............................ 700/27; 700/17; 700/65; 700/83; 700/86; 340/310.01; 702/122; 702/184; 702/188
(58) Field of Search ............................... 702/122, 183, 702/184, 188, 62; 700/17, 21, 23, 26, 27, 65, 83, 86, 174, 181, 18, 66; 340/310.01, 825; 701/29, 33

(56) References Cited

U.S. PATENT DOCUMENTS

| | | | | |
|---|---|---|---|---|
| 3,603,881 | A | * | 9/1971 | Thornton .................... 375/272 |
| 4,163,218 | A | * | 7/1979 | Wu ........................ 340/310.02 |
| 4,471,348 | A | * | 9/1984 | London et al. .............. 345/2.2 |
| 4,586,150 | A | * | 4/1986 | Budziak et al. ............. 702/164 |
| 4,719,616 | A | * | 1/1988 | Akano ........................ 370/527 |
| H678 | H | * | 9/1989 | Baker et al. ........... 340/310.02 |
| 5,487,516 | A | * | 1/1996 | Murata et al. .......... 246/182 C |
| 5,573,090 | A | * | 11/1996 | Ross ............................ 191/10 |
| 5,900,179 | A | * | 5/1999 | Bilenko et al. ............. 219/508 |
| 6,006,147 | A | * | 12/1999 | Hall et al. .................... 701/29 |
| 6,292,757 | B1 | * | 9/2001 | Flanagan et al. ........... 702/138 |
| 6,311,105 | B1 | * | 10/2001 | Budike, Jr. ................. 700/291 |
| 6,353,313 | B1 | * | 3/2002 | Estep et al. .................. 324/160 |
| 6,416,471 | B1 | * | 7/2002 | Kumar et al. ............... 600/300 |
| 6,430,451 | B1 | * | 8/2002 | Takahashi et al. ............. 700/3 |
| 6,552,661 | B1 | * | 4/2003 | Lastinger et al. ........ 340/572.1 |
| 6,567,730 | B2 | * | 5/2003 | Tanaka ......................... 701/33 |
| 6,573,831 | B2 | * | 6/2003 | Ikeda et al. ................. 340/505 |
| 6,656,119 | B2 | * | 12/2003 | Sasaki et al. ............... 600/437 |
| 6,678,535 | B1 | * | 1/2004 | Narayanaswami .......... 455/557 |
| 6,700,902 | B1 | * | 3/2004 | Meyer ......................... 370/468 |
| 6,725,179 | B1 | * | 4/2004 | Nagase ........................ 702/188 |
| 2002/0068983 | A1 | * | 6/2002 | Sexton .......................... 700/2 |
| 2002/0117986 | A1 | * | 8/2002 | Becerra et al. ............. 318/480 |

FOREIGN PATENT DOCUMENTS

| JP | 60035850 A | * | 2/1985 | ........... H04L/11/00 |
|---|---|---|---|---|
| JP | 7-209035 | | 8/1995 | |
| KR | 2002090420 A | * | 12/2002 | ............ H04Q/9/00 |

* cited by examiner

*Primary Examiner*—Anthony Knight
*Assistant Examiner*—Crystal J Barnes
(74) *Attorney, Agent, or Firm*—Leydig, Voit & Mayer, Ltd.

(57) ABSTRACT

A state-of-device remote monitor system capable of applying a general-purpose line as a transmission line for transmitting detection signals of a state of a device, comprises an on-the-spot area, and a management area. The on-the-spot area includes an electric device, a detector for detecting a device state of the electric device, and a first communication signal converter for converting detection data obtained by the detection of the detector into communication signals, and transmitting the communication signals. The management area includes a second communication signal converter for converting the communication signals received from the first communication signal converter into the detection data before being converted by the first communication signal converter, a maintenance tool having a diagnostic/analytic program for analyzing the device state from the detection data converted by the second communication signal converter, and a maintenance database stored with data necessary for the analysis by the diagnostic/analytic program and a diagnosed result, and a display unit for displaying the diagnosed result obtained by the analysis by the maintenance tool.

19 Claims, 27 Drawing Sheets

STATE-OF-DEVICE REMOTE MONITORING SYSTEM

This application is based on Application No. 2001-259863, filed in Japan on Aug. 29, 2001, the contents of which are hereby incorporated by reference.

BACKGROUND OF THE INVENTION

1. Field of the Invention

The present invention relates generally to a state-of-device remote monitor system, and more particularly to a state-of-device remote monitor system for remotely obtaining various categories of data about a temperature, vibrations and so on in an operating state of an electric device such as an electric motor.

2. Description of the Related Art

In a large-scale plant such as a power plant, water treatment plant, etc. which often use electric motors, if something abnormal is detected by monitoring a device state of the electric motor, a generator or a transformer installed in the plant, it is important in terms of reliability of the plant and enhancing operating ratio to obtain details of this abnormality.

An introduction of a state-of-device remote monitor system for observing various items of data obtained from a target device installed in the plant and monitoring a state of the device on the basis of these items of data, has been promoted over the recent years for attaining the above purpose.

Further, this type of state-of-device remote monitor system that targets not only the mechanical and electrical equipment, such as electric motors, generators, pumps, valves, and pipes, but also measuring devices for a calculator and a substrate, has been accelerated in its development and is at a stage of being introduced. The state-of-device remote monitor system, as compared with the conventional method in which an operator patrols inside the plant and observes the devices, is classified based on its usage into a system that measures the data of a target device periodically or arbitrarily and observes the state of the device when measured, and a system that measures the state of the target device on-line at all times and continuously monitors its state.

Moreover, the state-of-device remote monitor system takes a man-based method of manually extracting and inputting the data obtained from the various detectors to a database and manually analyzing the data accumulated in the database.

The state-of-device remote monitor system described above might, however, be operated by a method of monitoring the device state online at all times. In such a case, it is not realistic that the man-based process is done as an intermediary process between a data measurement by the detector and a judgment for presuming the device state on the basis of the measured data.

For example, Japanese Patent Application Laid-open No. Hei 7-209035 (titled State-of-Device Remote Monitor System) discloses, as a technology for obviating these problems, a conventional state-of-device remote monitor system in which the data extraction and analysis are automated. FIG. 27 shows a typical architecture of this system.

Referring to FIG. 27, a laser-based detector 22 such as a vibration system sensors, a temperature sensor and a visible image extraction sensor installed in an on-the-spot area 11 like a plant, detects a state of equipment device 21 such as an electric motor, a pump, a valve and a pipe. The detection signals thereof are transmitted to a maintenance tool 50 in a management area 12 existing at a remote distance via a dedicated transmission line 101. In the management area 12, the maintenance tool 50 receives the various items of data transmitted from the detector 22, and the received data are analyzed by a preset diagnostic/analytic program 52. A result thereof is displayed on a display unit 54.

The conventional state-of-device remote monitor system is thus constructed. Therefore, the dedicated transmission line 101 that connects the detector 22 directly to the maintenance tool 50, however, if a multiplicity of monitor target devices 21 exist in the on-the-spot area 11, it is required that cables 101 as the dedicated transmission lines be extended for the respective detectors 22 attached to the devices 21.

Further, a digital multiplex data transmission system generally used for a monitor control unit in the on-the-spot area 11 can be applied. In this case also, however, the cable for at least the data transmission is required to be extended.

Thus, if the monitor of the state of the device 21 needs the extension of the cable, there arises a problem related to a cost for introducing the cable even if possible of extending the cable.

Moreover, the monitor target device 21 may be installed at a high place or on the underground within the plant or within a storage container in a nuclear power plant, wherein it is considered difficult to extend a new cable. Therefore, a problem is that the extension of the cable becomes an obstacle against the introduction.

SUMMARY OF THE INVENTION

It is a primary object of the present invention, which was devised to obviate the problems described above, to provide a state-of-device remote monitor system capable of applying a general-purpose line as a transmission line for transmitting detection signals of a state of a device.

To accomplish the above object, according to one aspect of the present invention, a state-of-device remote monitor system comprises an on-the-spot area, and a management area. The on-the-spot area includes an electric device, a detector for detecting a device state of the electric device, a first communication signal converter for converting detection data obtained by the detection of the detector into communication signals, and transmitting the communication signals, and a controller, having a memory for storing the detection data obtained by the detection of the detector, for storing the memory with the detection data obtained by detecting the device state with the detector on the basis of a preset detection start program, and outputting the detection data stored in the memory to the first communication signal converter on the basis of a preset communication start program that runs corresponding to a storage of the predetermined detection data. The management area includes a second communication signal converter for converting the communication signals received from the first communication signal converter into the detection data before being converted by the first communication signal converter, a maintenance tool having a diagnostic/analytic program for analyzing the device state from the detection data converted by the second communication signal converter, and a maintenance database stored with data necessary for the analysis by the diagnostic/analytic program and a diagnosed result, and a display unit for displaying the diagnosed result obtained by the analysis by the maintenance tool.

The state-of-device remote monitor system may further comprise a general-purpose network for transmitting the communication signals transmitted from the first communication signal converter to the second communication signal converter.

The first communication signal converter may convert the detection data into radio signals and transmit the radio signals, and the second communication signal converter may convert the radio signals received from the first communication signal converter into the detection data before being converted by the first communication signal converter.

The on-the-spot area may include a mobile communication device for transmitting the radio signals on the basis of the communication signals converted by the first communication signal converter, and the general-purpose network may include at least a base station for receiving the radio signals of the mobile communication device and converting the radio signals into the communication signals, and a mobile communication network for transferring the communication signals converted by the base station to a public line network.

The state-of-device remote monitor may further comprise a power line for supplying the electric device with electric power from a power source device, and a connecting device for connecting the power line, the controller and the first communication signal converter to each other. The controller may transmit the detection data to the first communication signal converter via the connecting device and the power line.

The state-of-device remote monitor system may further comprise a current transformer, provided on the power line, for taking an electric current in a non-contact manner from within the power line, and a power source circuit for supplying the electric power to the controller on the basis of the current taken out by the current transformer.

When the on-the-spot area is within a train mounted with a train radio device for adjusting a traffic schedule, the detection data stored in the memory may be wirelessly transmitted to the second communication signal converter from the train radio device by use of the train radio device as the first communication signal converter.

The state-of-device remote monitor system may further, if the on-the-spot area is within an automobile, comprise a mobile record terminal downloaded with the detection data stored in the memory by connecting a communication cable disconnectable from and connectable to the first communication signal converter, and a mobile communication device, connected to the mobile record terminal, for converting the detection data downloaded into the mobile record terminal into the radio signals and transmitting the radio signals. The general-purpose network may include at least a base station for receiving and converting the radio signals of the mobile communication device into the communication signals, and a mobile communication network for transferring the communication signals converted by the base station to a public line network.

The state-of-device remote monitor system may further, if the on-the-spot area is within an electric car mounted with a battery for supplying the electric power, comprise a power source/communication cable disconnectable from and connectable to the battery, and a power control device for charging the battery with the electricity from the power source device by connecting the power source/communication cable with the battery, downloading with the detection data stored in the memory, and transferring the detection data to the general-purpose network.

The controller may not include the memory, may detect a device state trough the detector on the basis of a preset detection start program if a communication route between the first communication signal converter and the general-purpose network is established, and output the detection data to the first communication signal converter on the basis of a preset communication start program in accordance with the detection.

The maintenance tool may output a state-of-device detection start command of the electric device to the controller at a predetermined time, and the controller may execute the detection start program on the basis of the state-of-device detection start command.

If the controller detects the device state through the detector with a fixed period, the maintenance tool may output to the controller a command to change the detection period of the detector in accordance with a diagnosed result from the detection data on the basis of a preset program, and the controller may detect the detection data from the detector with the period changed based on the detection period change command.

The state-of-device remote monitor system may further comprise a mobile communication device for issuing a piece of abnormality information upon receiving the same abnormality information. The maintenance tool may transmit, if the diagnosed result from the detection data shows the abnormality, the abnormality information to the mobile communication device.

The maintenance tool may include a maintenance procedure database stored beforehand with plural items of maintenance procedure data corresponding to a variety of abnormal states, extract the maintenance procedure data corresponding to the abnormal information from the maintenance procedure database if the diagnosed result from the detection data shows the abnormality, and transmit the extracted maintenance procedure data together with the abnormal information to the mobile communication device.

The state-of-device remote monitor system may further comprise a user's own maintenance terminal connected to the general-purpose network and issuing the data received via the general-purpose network. The maintenance tool may be managed by an in-charge-of-maintenance company in charge of monitoring a device state of the electric device, and may output the diagnosed result based on the diagnostic/analytic program to the maintenance terminal.

The maintenance tool may include a device database stored beforehand with device specifications of a variety of electric devices, and a maintenance procedure database stored beforehand with plural items of maintenance procedure data corresponding to the variety of abnormal states, and output to the maintenance terminal the device specification corresponding to the analyzed electric device and the maintenance procedures corresponding to the diagnosed result together with the diagnosed result based on the diagnostic/analytic program.

The mobile communication device may be owned by a maintenance worker of the in-charge-of-maintenance company in charge of monitoring the device state of the electric device, the maintenance tool may be managed by the in-charge-of-maintenance company and may include a position database stored with position data of the mobile communication device, and a maintenance worker invoke program for extracting, if the diagnosed result based on the diagnostic/analytic program shows the abnormality, the mobile communication device proximal in position to the electric device diagnosed abnormal from the position database and calling up the mobile communication device.

The maintenance tool may include a device database stored beforehand with device specifications of a variety of electric devices, and a maintenance procedure database stored beforehand with plural items of maintenance procedure data corresponding to the variety of abnormal states, and the maintenance worker invoke program may call up the mobile communication device and provide the mobile communication device for the maintenance worker with the device specifications corresponding to the electric device diagnosed abnormal and the maintenance procedures corresponding to the monitored result.

DETAILED DESCRIPTION OF THE PREFERRED EMBODIMENTS

Embodiment 1

Figure 1:
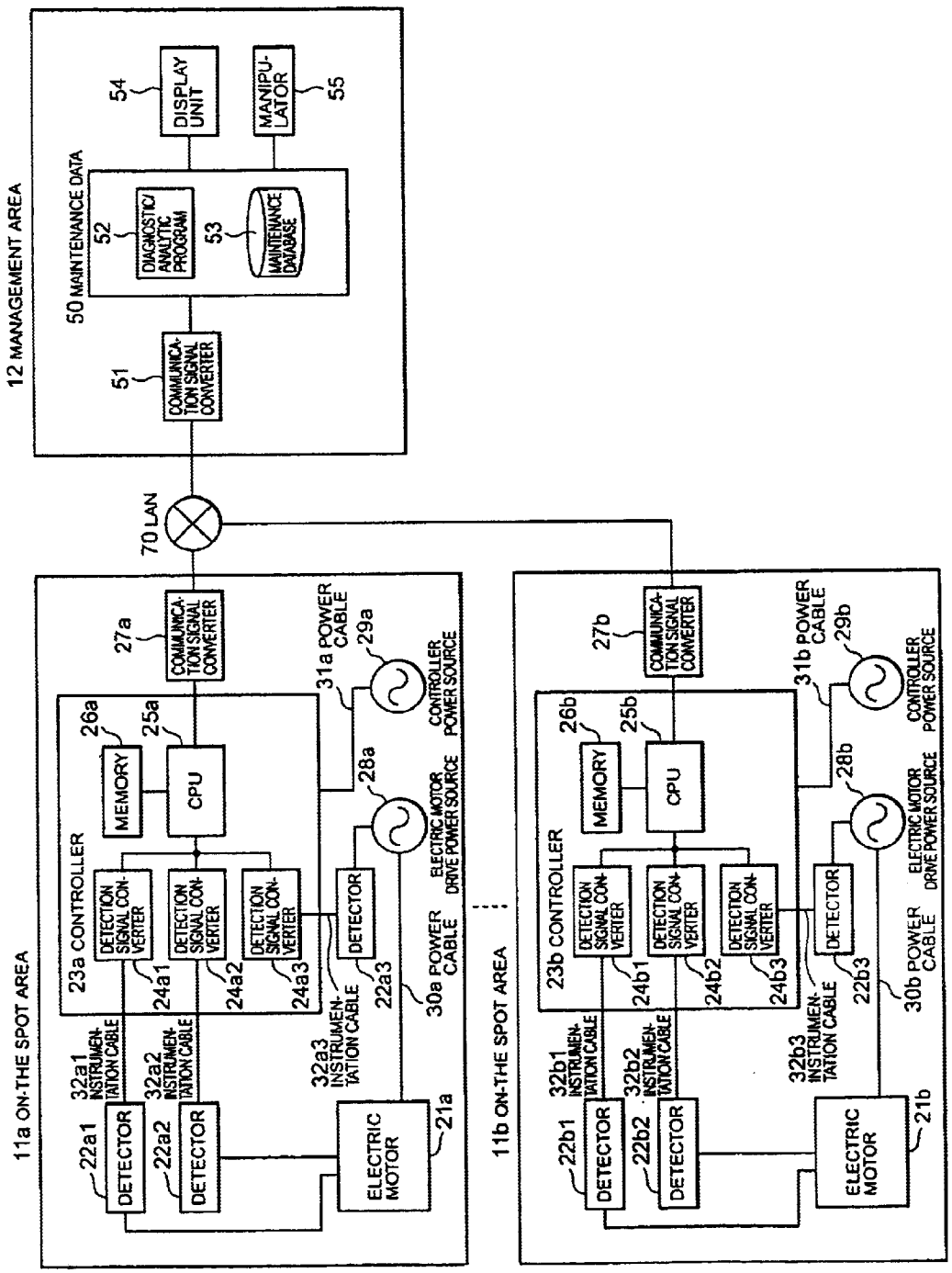
FIG. 1 is a diagram showing an architecture of a state-of-device remote monitor system in Embodiment 1 of the present invention.
Figure 2:
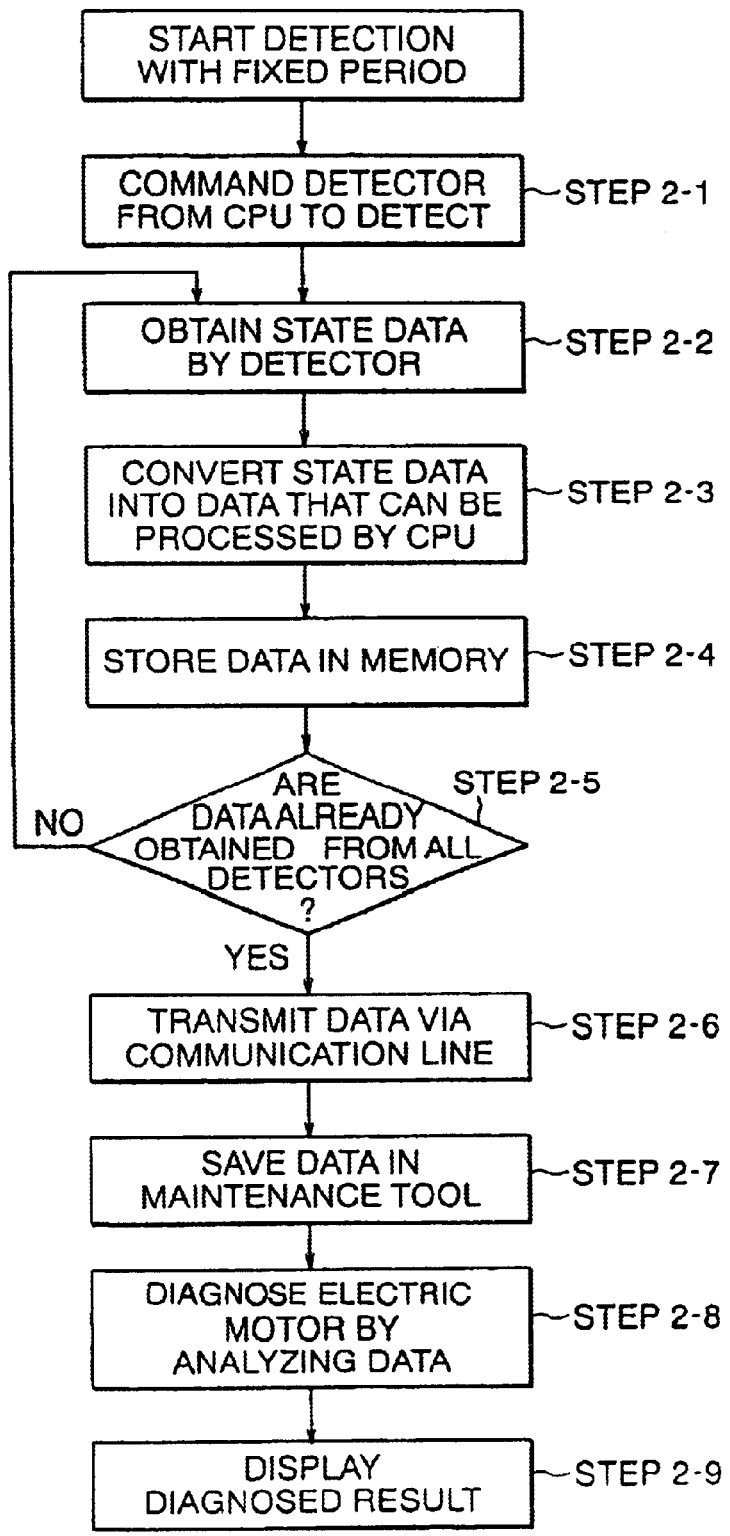
FIG. 2 is a flowchart showing an operation of the state-of-device remote monitor system in Embodiment 1 of the present invention.

FIG. 1 is a diagram showing an architecture of a state-of-device remote monitor system in accordance with the present invention. FIG. 2 is a flowchart showing an operation in Embodiment 1.

As shown in FIG. 1, the architecture in Embodiment 1 is configured by a single or a plurality of on-the-spot areas 11$a$, 11$b$ and a management area 12 existing at some distance from the on-the-spot areas 11$a$, 11$b$.

In the on-the-spot area 11$a$, an electric motor 21$a$ is supplied with the electricity via a power cable 30$a$ from a power source 28$a$. States of the electric motor 21$a$ and the power source 28$a$ are detected by a plurality of detectors 22$a$1, 22$a$2, 22$a$3 attached thereto, and detection signals thereof are transmitted to a controller 23$a$ via instrumentation cables 32$a$1, 32$a$2, 32$a$3.

Detection signal converters 24$a$1, 24$a$2, 24$a$3 convert the signals transmitted via these instrumentation cables 32$a$1, 32$a$2, 32$a$3 into digital signals that can be processed by a CPU 25$a$. The detection signals and instructions are stored in a memory 26$a$ in accordance with a signal processing instruction of the CPU 25$a$, or outputted to a communication signal converter 27$a$ for converting them into communication signals in a communication format suited to transmissions to the management area 12.

Note that the controller 23$a$ includes the detection signal converters 24$a$1, 24$a$2, 24$a$3, the CPU 25$a$ and the memory 26$a$, and is supplied with the electric power via a power cable 31$a$ from a power source 29$a$.

Herein, the discussion has been focused on the on-the-spot area 11$a$, however, another on-the-spot area 11$b$ has the same configuration if a plurality of on-the-spot areas exist.

The detector 22$a$ is defined as a detector needed for monitoring the state of the electric motor 21$a$. The detector 22$a$ is constructed of an element for detecting an operating state of the electric motor 21a, a thermocouple or an RTD (Resistance Temperature Detector) for measuring a temperature, a vibration sensor for detecting vibrations of the electric motor 21a, a resistance meter for detecting insulation, a current transformer (CT) or a current meter for detecting the electric current, and a potential transformer (PT) or a voltage meter for measuring a voltage.

The detection signal converter 24a differs in its device category needed depending on a type of the detector 22a. For example, if the detector 22a1 is the thermocouple, the detection signal converter 24a1 is constructed of a combination of the thermocouple and an A/D converter.

Further, the management area 12 is configured by a communication signal converter 51, a maintenance tool 50, a display unit 54 and a manipulator 55. The maintenance tool 50 is defined as a computer such as a personal computer (PC) and a work station (WS) stored inside with a diagnostic/analytic program 52 and a maintenance database 53.

The plurality of on-the-spot areas 11a, 11b and the management area 12 having the configurations described above, embrace communication signal converters 27a, 27b, 51 connected to each other via a LAN 70.

Next, the operation in Embodiment 1 will hereinafter be explained with reference to FIG. 2.

Referring to FIG. 2, in step 2-1, the CPU 25a of the controller 23a transmits to the detector 22a1 signals for detecting the state of the electric motor 21a with a predetermined fixed period. This fixed period is a period for obtaining pieces of data necessary for monitoring the state of the electric motor 21a, and is set, for instance, once a week.

In step 2—2, the detector 22a1 receiving a detection command obtains the data about the state of the electric motor, and transmits the same data back to the controller 23a.

Subsequently, in steps 2-3 and 2-4, the controller 23a operates the detection signal converter 24a1 to convert the detection data received from the detector 22a1 into digital-signal-formatted data that can be processed by the CPU, and the data, after being processed by the CPU 25a, are stored in the memory 26a.

It us determined in step 2-5 whether the detection data have already been obtained from all the detectors 22a, and the processes in steps 2—2 through 2-4 are repeated until all the detection data are acquired.

In next step 2-6, after the detection data given from the plurality of detectors 22a1, 22a2, 22a3 have been stored in the memory 26a, the detection data are transmitted to the communication signal converter 27a through the processing by the CPU 25a and further transmitted to the management area 12 via the LAN 70.

In step 2-7, within the management area 12, the detection data transmitted via the LAN 70 from the on-the-spot area 11a are inputted via the communication signal converter 51 to the maintenance tool 50. The maintenance tool 50 stores the detection data in the maintenance database 53. In step 2-8, the maintenance tool 50 runs the diagnostic/analytic program 52 to compare and analyze the detection data transmitted and stored so far on the basis of various categories of maintenance data corresponding to the target electric motor 21a.

In step 2-9, the maintenance tool 50 outputs and displays a result of analysis obtained in the way described above on the display unit 54.

Thus, a maintenance worker in the management area 12 is able to monitor the state of the electric motor 21a in the on-the-spot area 11a by referring to the diagnostic result on the display unit 54. Besides, the maintenance worker is able to refer to the diagnostic results in the past and a diagnostic result of another electric motor 22b and so on by displaying these results on the display unit 54 in a way that changes over them by the manipulator 55. The variety of maintenance information displayed on the display unit 54 can be thus referred to.

As discussed above, the state-of-device remote monitor system in Embodiment 1 includes the first communication signal converter 27 for converting the detection data obtained by the detection of the detector 22 into the communication signals in the communicable format, and the second communication signal converter 51 for converting the signal data into the detection data before being converted by the first communication signal converter 27, thereby making it possible to apply the general-purpose LAN 70 as a transmission network for transmitting the detection data and to actualize the state-of-device remote monitor system easy to introduce the equipment.

Further, the states of the plurality of electric motors 21a, 21b are periodically automatically detected, and automatically diagnosed and analyzed. Hence, a quantity of the on-the-spot works of the maintenance worker can be made smaller than that of the conventional method of the maintenance worker's obtaining the data from the spot and analyzing the data, and the dangerous works on the spot can be eliminated. The maintenance data about the plurality of electric motors 21a, 21b are automatically stored and can be therefore compared and analyzed with respect to old pieces of maintenance data of the same type of electric motor, whereby an improvement of analysis accuracy can be expected.

Embodiment 2

Figure 3:
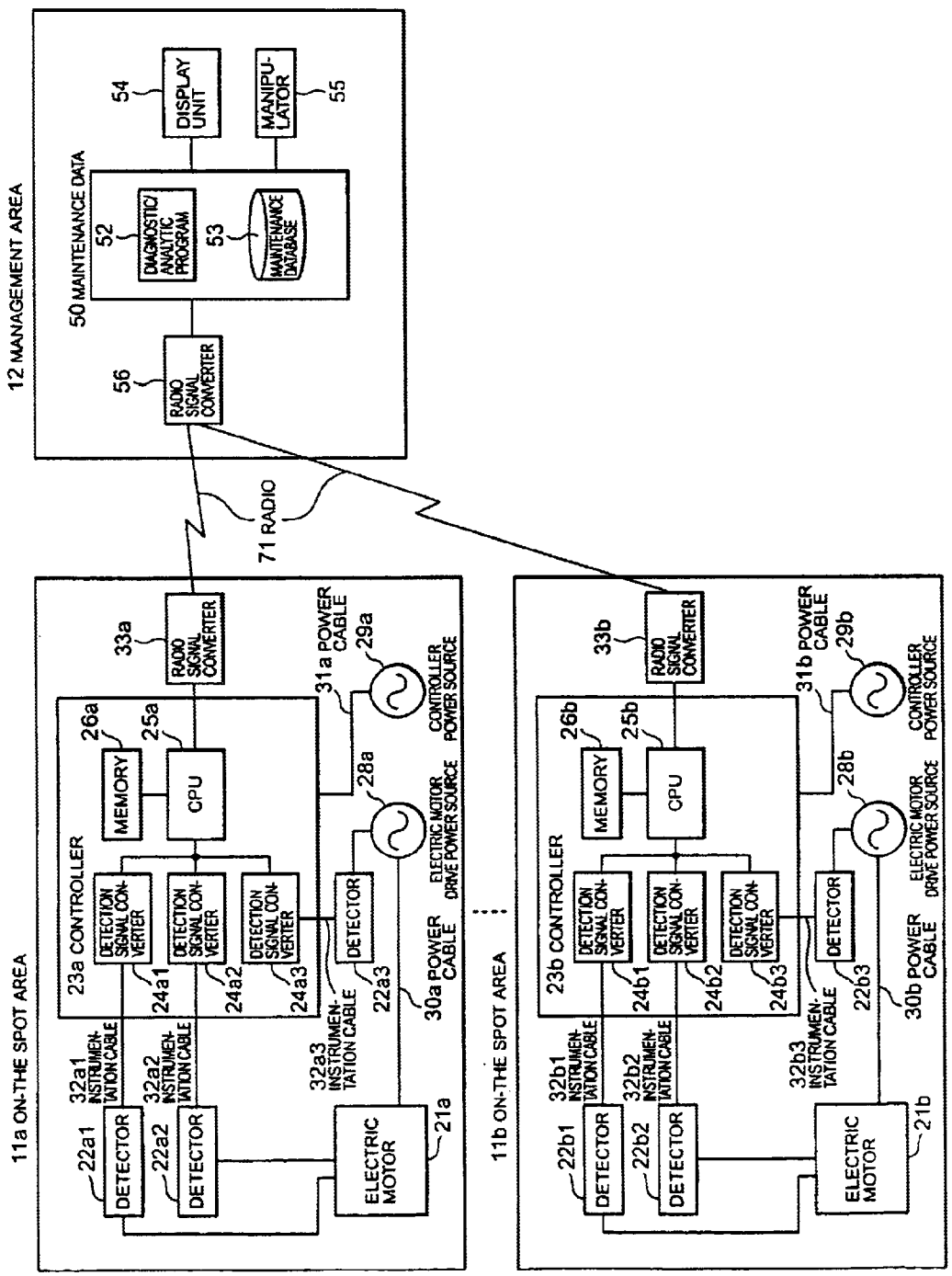
FIG. 3 is a diagram showing an architecture of the state-of-device remote monitor system in Embodiment 2 of the present invention.

FIG. 3 illustrates an embodiment different from Embodiment 1. According to Embodiment 1, the data transmission between the on-the-spot area 11a and the management area 12 involves applying the LAN 70. According to Embodiment 2, however, as shown in FIG. 3, the data transmission between the on-the-spot area 11a and the management area 12 involves applying a radio system.

In Embodiment 2, a hardware architecture between the controller 23a and the maintenance tool 50 is different from that in Embodiment 1, and is configured by a radio signal converter 33a for converting the detection data outputted from the controller 23a in the on-the-spot area 11a into radio signals, and a radio signal converter 56 for converting the radio signals in the management area 12 into data signals in the management area 12.

The discussion will be focused on a different system operation of the state-of-device remote monitor system in Embodiment 2 from Embodiment 1. The detection data obtained from all the detectors 22a in the on-the-spot area 11a are stored in the memory 26a. The detection data stored in the memory 26a are fetched based on a command outputted from the CPU 25a on the basis of, e.g., a predetermined quantity of storage or a predetermined period, and are converted by the radio signal converter 33a into radio signals to be transmitted. The radio signals are then transmitted from the on-the-spot area.

The radio signals transmitted from the on-the-spot area are received and converted by the radio signal converter 56 in the management area 12, and the thus converted data are thereafter sent to the maintenance tool 50.

As described above, the state-of-device remote monitor system in Embodiment 2 has no necessity of extending any cable between the on-the-spot area 11a and the management area 12. Therefore, in case a region between the on-the-spot area 11a and the management area 12 is difficult to extend the cable, or if a cost for extending the cable rises, the monitor system as a whole can exhibit an advantage in terms of cost-performance by applying the radio system. Moreover, there is no necessity of maintenance of the cable itself, and hence the maintainability of the system enhances.

Figure 4:
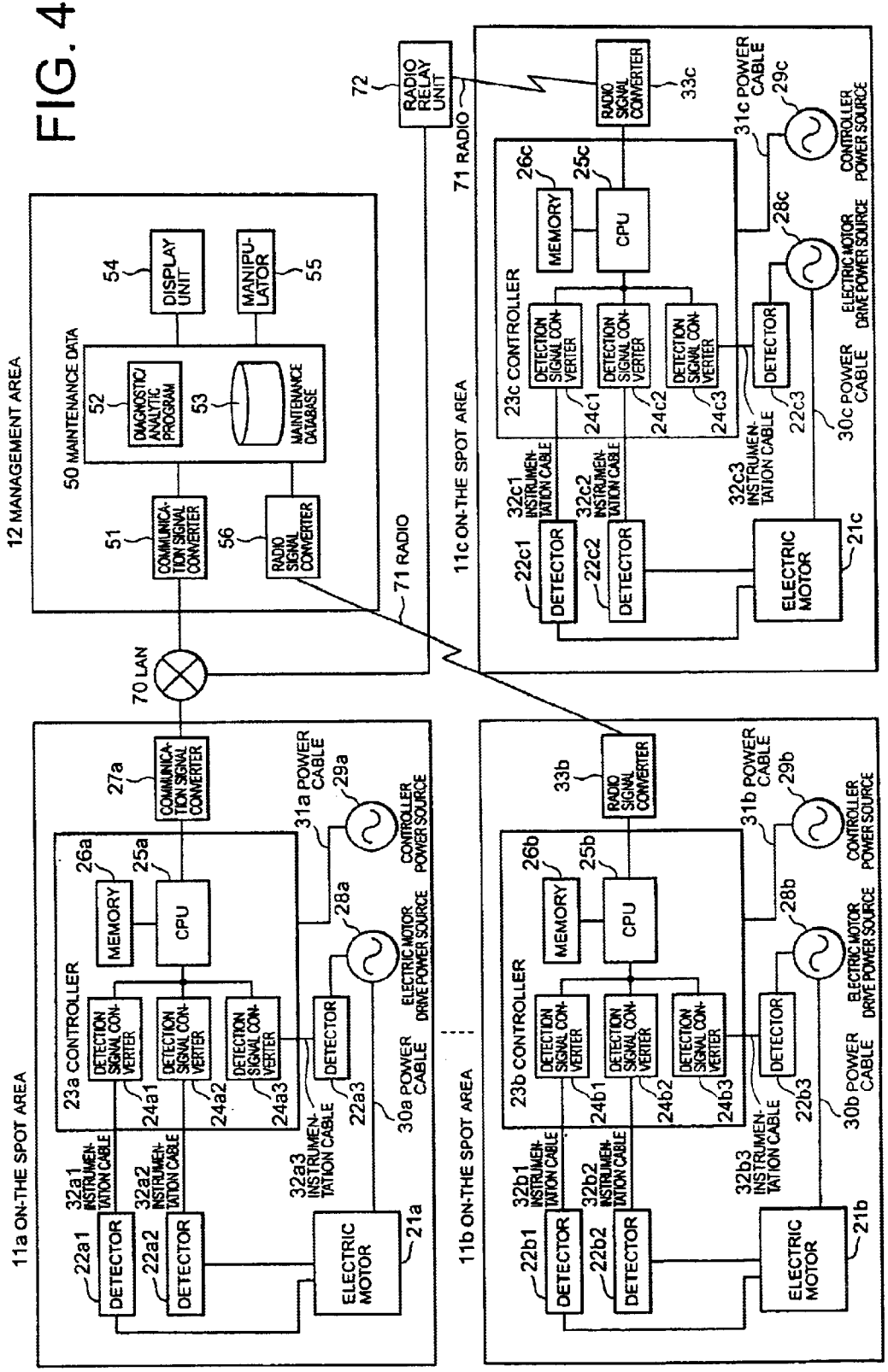
FIG. 4 is a diagram showing an architecture of a state-of-device remote monitor system as a combined version of Embodiments 1 and 2 of the present invention.

Note that the system architectures in Embodiments 1 and 2 may be, as shown in FIG. 4, cross-adopted, wherein the data can be transmitted and received via the LAN between the management area 12 and the on-the-spot area 11a of the plurality of areas 11a, 11b, and wirelessly between the area 11b and the management area 12. Further, as a combined version of the radio system and the LAN, the LAN 70 and a radio relay unit 72 for relaying the signals are provided between one on-the-spot area 11c and the management area 12, thus configuring a transmission route.

Embodiment 3

Figure 5:
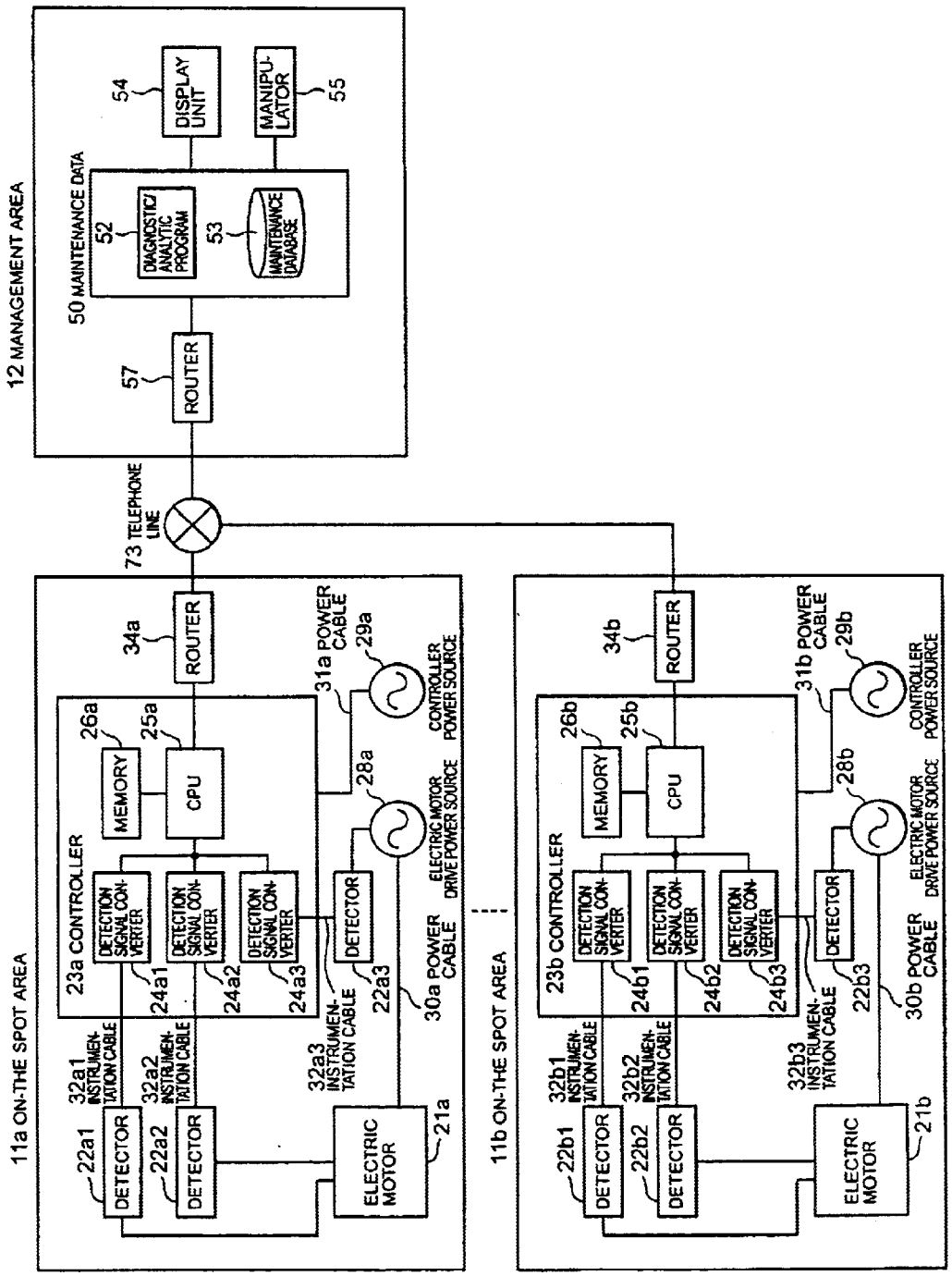
FIG. 5 is a diagram showing an architecture of the state-of-device remote monitor system in Embodiment 3 of the present invention.

FIG. 5 shows an embodiment different from Embodiments 1 and 2. According to Embodiments 1 and 2, the data transmission between the on-the-spot area 11a and the management area 12 involves applying the LAN 70 and the radio 71. In Embodiment 3, however, the data transmission involves applying, as shown in FIG. 5, a public telephone line 73.

A different architecture in Embodiment 3 from Embodiment 1 is provided between the controller 23a and the maintenance tool 50, and is configured by a router 34a for transferring the signals outputted from the controller 23a in the on-the-spot area 11a to the telephone line 73, and a router 57 for transferring the signals from the telephone line 73 to the maintenance tool 50 in the management area 12. Note that the telephone line 73 is a part of the existing infrastructures.

If the telephone line is not connected, a connection of the telephone line is established by dial-up accesses of the routers 34a and 57. Further, if the telephone line is classified as an analog line, a modem may also be used.

There will be given an explanation of a different operation of the state-of-device remote monitor system in Embodiment 3 from Embodiment 1.

The data obtained from all the detectors 22a in the on-the-spot area 11a are stored in the memory 26a and subsequently, after establishing a connection between the router 34a and the router 57, transmitted to the telephone line 73. The router 57 in the management area 12 transfers the data coming from the telephone line to the maintenance tool 50.

As discussed above, the state-of-device remote monitor system in Embodiment 3 is capable of, even if the on-the-spot area 11a and the management area 12 where the maintenance worker exists are not the same premises, monitoring the states of the electric motors 21a, 21b installed in the plurality of places in one single management area 12 by establishing the connection between the on-the-spot area 11a and the management area 12 through the telephone line 73.

Embodiment 4

Figure 6:
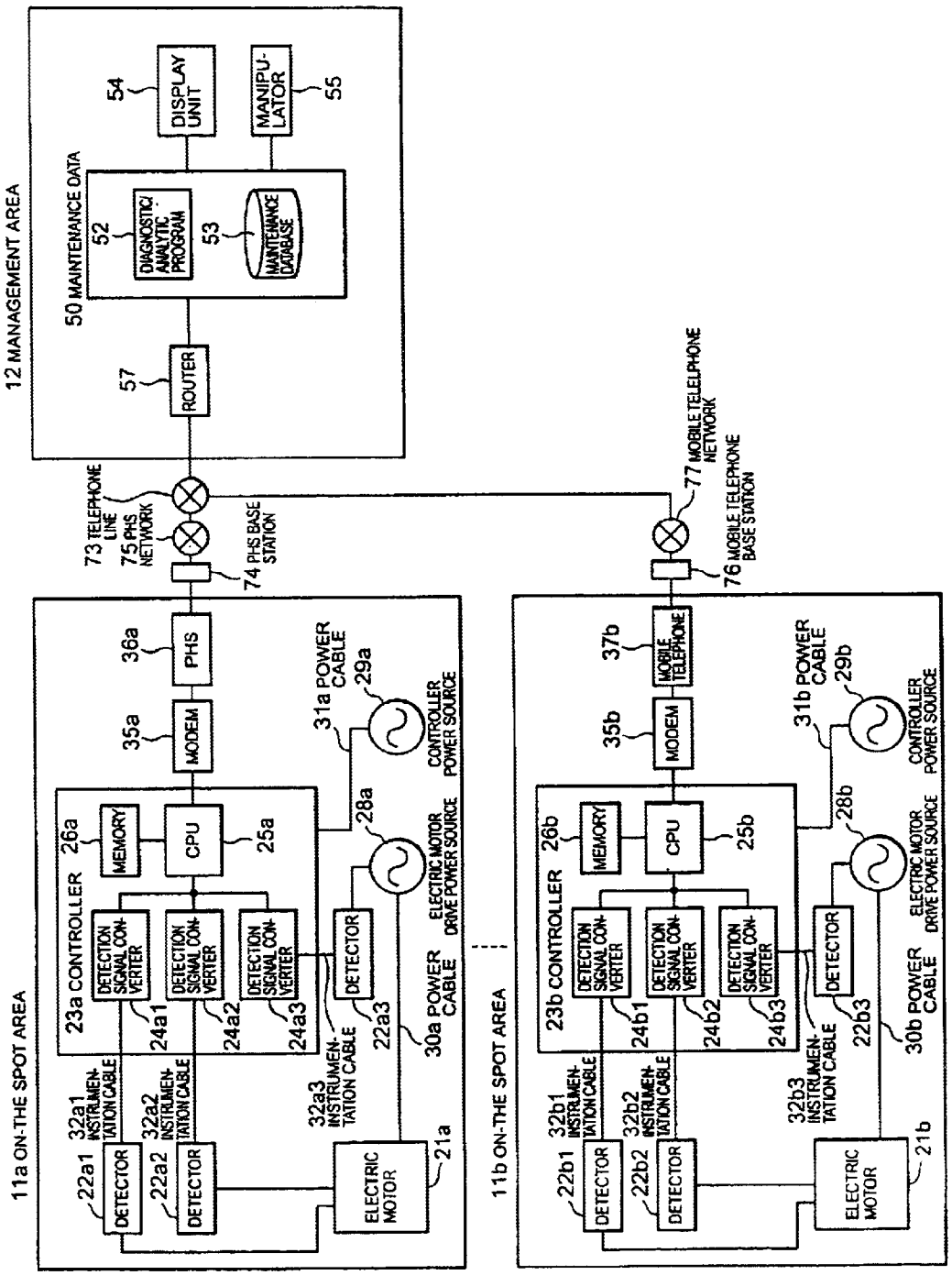
FIG. 6 is a diagram showing an architecture of the state-of-device remote monitor system in Embodiment 4 of the present invention.

FIG. 6 shows an embodiment different from Embodiments 1 through 3. According to Embodiment 3 discussed above, the data transmission between the on-the-spot area 11a and the management area 12 involves applying the telephone line 73, however, Embodiment 4 involves applying, as shown in FIG. 6, a PHS network 75 or a mobile telephone network 77.

A different architecture in Embodiment 4 from Embodiment 3 is provided between the controller 23a and the maintenance tool 50, and is configured by a data conversion modem 35a used for a PHS 36a to transmit the signals outputted from the controller 23a in the on-the-spot area 11a, a PHS base station 74 for receiving the signals transmitted from the PHS 36a, the PHS network 75 connected to the PHS base station 74, the telephone line 73 connected to the PHS network 75, and a router 57 provided in the management area 12.

Further, in the case of using a mobile telephone 37b, an architecture between the controller 23b and the maintenance tool 50 is configured by a data conversion modem 35b used for the mobile telephone 37b to transmit the signals outputted from the controller 23b in the on-the-spot area 11b, a mobile telephone base station 76 for receiving the signals transmitted from the mobile telephone 37b, a mobile telephone network 77 connected to the mobile telephone base station 76, the telephone line 73 connected to the mobile telephone network 77, and the router 57 in the management area 12. Note that the PHS base station 74, the PHS network 75, the telephone line 73, the mobile telephone base station 76 and the mobile telephone network 77 are some proportion of the equipment of the existing infrastructures.

Further, if the telephone line is not connected, the connection of the telephone line is established by the dial-up accesses of the PHS 36a, the mobile telephone 37b and the router 57.

A different operation of the state-of-device remote monitor system in Embodiment 4 from Embodiment 1, will be explained. The data obtained from all the detectors 22a in the on-the-spot area 11a are stored in the memory 26a, and subsequently, after the connection between the PHS 36a and the router 57 has been established, the data coming through the telephone line modem 35a are transmitted from the PHS 36a to the PHS base station 74. The signals received by the PHS base station 74 are transmitted to the router 57 via the PHS network 75 and the telephone line 73 defined as the equipment of the infrastructure of the telephone company, and the router 57 obtains the data from the telephone line. Thereafter, the data are sent to the maintenance tool 50. Note the operation in the case of using the mobile telephone 37b is the same.

As discussed above, the state-of-device remote monitor system in Embodiment 4 is capable of, if the on-the-spot area 11a and the management area 12 where the maintenance worker exists are not the same premises and if the cable such as the telephone line is not extended in the on-the-spot area 11a, monitoring the states of the electric motors 21a, 21b installed in the plurality of places in the single management area 12 by establishing the connection between the on-the-spot area 11a and the management area 12 through the PHS 36a or the mobile telephone 37a. Further, in the case of the PHS 36a and the mobile telephone 37b, there is no necessity of providing the transmission-side equipment as compared with Embodiment 2 because of the infrastructure being provided by the telephone company.

Embodiment 5

Figure 7:
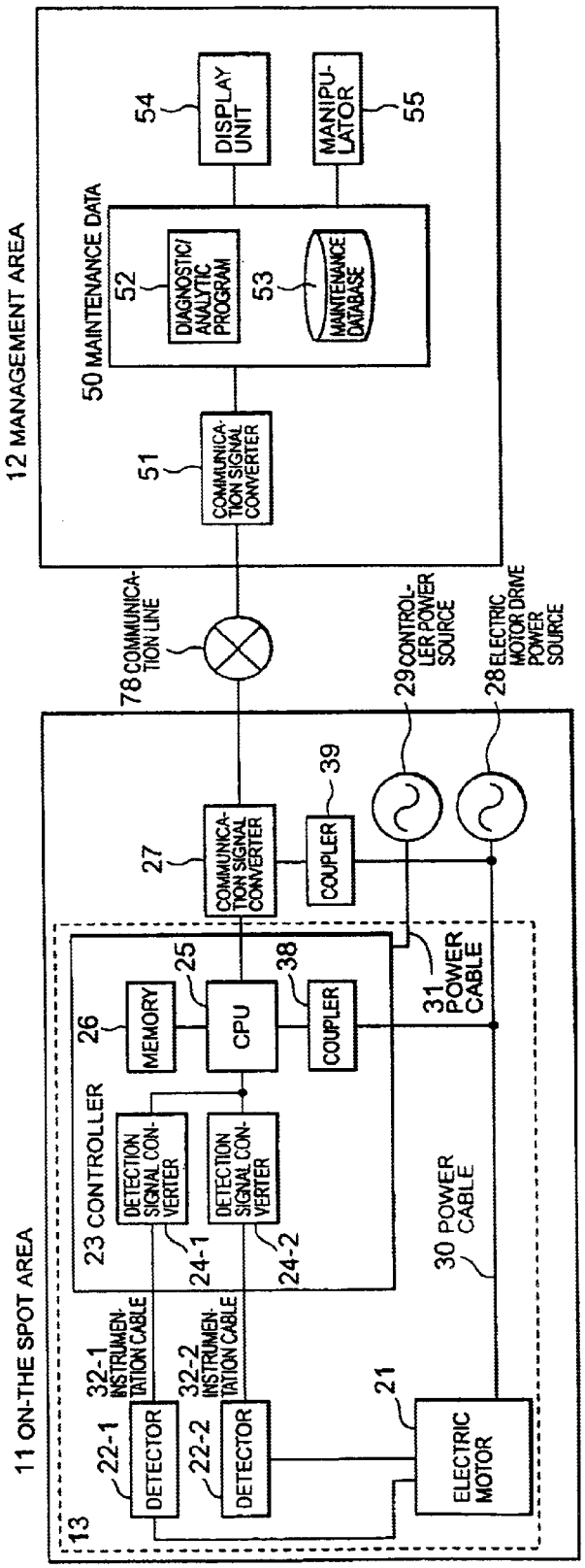
FIG. 7 is a diagram showing an architecture of the state-of-device remote monitor system in Embodiment 5 of the present invention.

FIG. 7 shows a different embodiment from Embodiments 1 through 4. According to Embodiments 1 through 4, the data transmission between the on-the-spot area 11 and the management area 12 involves applying the communication lines such as the LAN 70, the radio 71, the telephone line 73, the PHS network 75 or the mobile telephone network 77 or the communication lines based on the cross-adopted system thereof. The connection between the communication line and the controller 23 is established by use of the cable via the converter. According to Embodiment 5, however, as shown in FIG. 7, what is applied between the communication line 78 and the controller 23 is a carrier system using a power line such as a power source cable 31.

A different architecture in Embodiment 5 from Embodiment 1 discussed above will be described. According to Embodiment 5, the on-the-spot area 11 including the electric motor 21 and the detector 22 exists on the underground 13 with no extension of the LAN, wherein the radio waves and the electronic waves of the PHS or the mobile telephone can not reach. A coupler 38 for the power line carrier is provided on an output side of the controller 23 within the on-the-spot area 11 between the CPU 25 and the communication signal converter 27. The coupler 38 is connected to a power source cable 30 for supplying the electricity to the electric motor 21. Further, a coupler 39 is provided between the communication signal converter 27 and the power source cable 30.

A different operation of the state-of-device remote monitor system in Embodiment 5 from Embodiment 1 will be explained. The detection data obtained from all the detectors 22a in the on-the-spot area 11a are stored in the memory 26a and thereafter inputted via the coupler 38 to the power source cable 30. The detection data transmitted through the power source cable 30 are transferred to the communication signal converter 27 via the coupler 39. Thereafter, the data are transmitted to the management area 12 via the communication line 78 as in Embodiment 1.

As discussed above, the state-of-device remote monitor system in Embodiment 5 is capable of, if the electric motor 21 is provided in the area where neither the radio waves nor the electronic waves of the PHS and the mobile telephone reach and if provided on the underground such as having no LAN extended there or provided in a storage container in a nuclear power plant, transmitting the data outside from the underground or the storage container without a new extension of the instrumentation cable for transmitting the detection data and adding an electric penetration.

Furthermore, in addition to the case of the underground and the storage container, even when having no method for transmitting the signals from the periphery of the electric motor, a cable for the control signal to start up and stop the electric motor is extended in the vicinity of the power source in many cases. Hence, the signals can be transmitted via the control signal cable without extending a new cable to the vicinity of the power source, whereby a large proportion of extension of the cable can be reduced.

Embodiment 6

Figure 8:
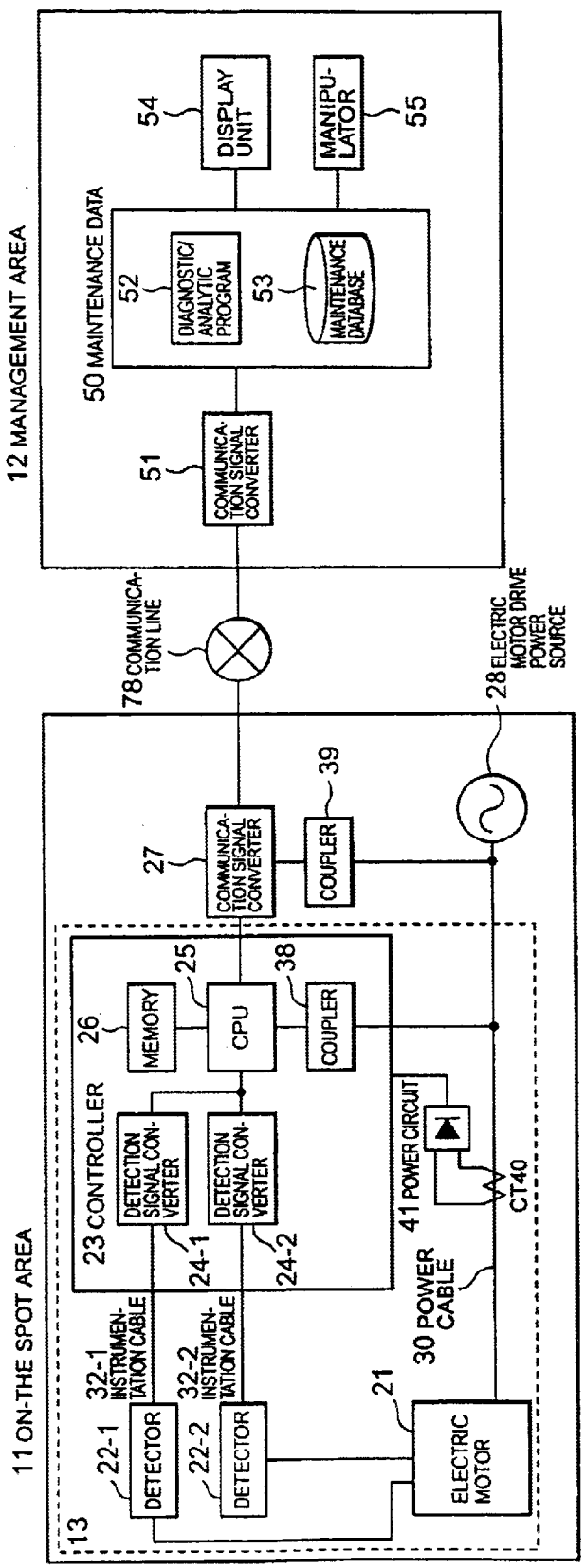
FIG. 8 is a diagram showing an architecture of the state-of-device remote monitor system in Embodiment 6 of the present invention.

FIG. 8 illustrates an embodiment different from Embodiments 1 through 5 discussed above. According to Embodiment 5, the electric power for operating the controller 23 installed in the on-the-spot area 11 is supplied from the power source 29 via the power cable 31. According to Embodiment 6, however, as shown in FIG. 8, the electric power is obtained and supplied from a power source 28 for supplying the electric motor 21 with the electric power.

A different architecture in Embodiment 6 from Embodiment 5 is that a current transformer (CT) 40 is provided halfway of the power cable 30 for supplying the electric power to the electric motor 21 from the power source 28, and a power source circuit 41 is disposed between the controller 23 and the current transformer 40.

An operation of the state-of-device remote monitor system in Embodiment 6 is that the current transformer 40 provided halfway of the power source cable 30 takes the electric power out of the power source cable 30 in a non-contact manner, and the thus taken-out electric power is rectified by the power source circuit 41 and thereafter supplied to the controller 23.

As discussed above, according to the state-of-device remote monitor system in Embodiment 6, the electric power for operating the controller 23a is obtained from the power source cable 30 for supplying the electric power to the electric motor 21 from the power source, and hence there is no necessity of extending the new power source cable. Accordingly, if the electric motor 21 is provided on the underground and the like, and if the power source cable is difficult to extend or if the electric penetration must be added, the system can be rationally configured.

Embodiment 7

Figure 9:
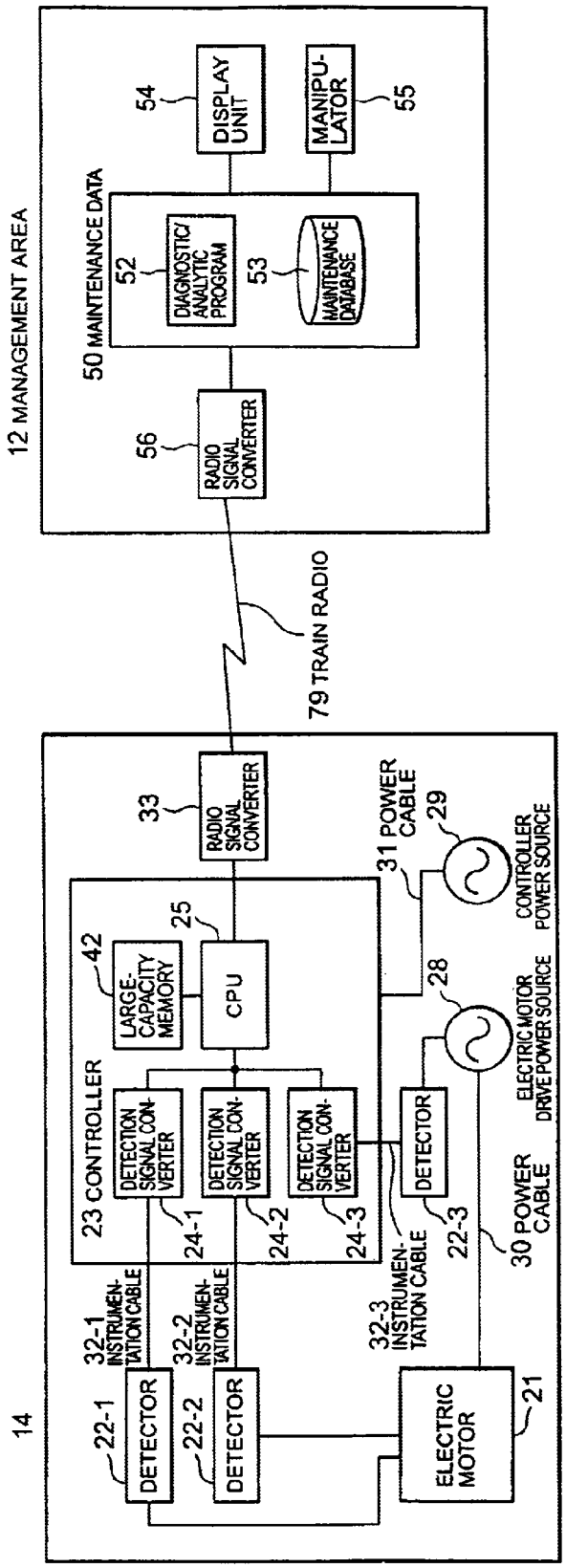
FIG. 9 is a diagram showing an architecture of the state-of-device remote monitor system in Embodiment 7 of the present invention.

The discussion has been focused on the system for monitoring the state of the electric motor installed in the fixed place in Embodiments 1 through 6. Embodiment 7, however, deals with a system for monitoring the electric motor 21, mounted in a train 14, for driving the train. FIG. 9 shows an architecture in Embodiment 7.

The components, configurations and operations for detecting the device state of the electric motor 21 are the same as those in Embodiments 1 through 6. A different point in Embodiment 7 from Embodiments 1 through 6 is that the train 14 is required to be in an operating state in order to obtain the data for monitoring the state of the electric motor 21. In this case, it is difficult to obtain the data through the LAN, the radio, the mobile telephone, the PHS and the power line carrier as those in the embodiments and to transmit the data to the maintenance tool 50 simultaneously.

It is therefore impossible to attain an ever-detected state of the electric motor, and it is required that the data be temporarily saved inside the train. For this purpose, the controller 23 is provided with a large-capacity memory 42 capable of storing the data obtained by detecting the device state a plurality of times. Note that the data obtained by the plurality of detecting operations might be simultaneously stored in the large-capacity memory 42, and therefore date/time attributes must be embedded in each set of data obtained.

Herein, a train radio 79 for adjusting a traffic schedule of the train is mounted in the train 14, and the data can be transmitted to the management area 12 from the train 14 by utilizing the train radio 79.

A different operation of the stat-of-device remote monitor system in Embodiment 7 from Embodiment 1 will be explained. When the state data of the electric motor 21 are stored in the large-capacity memory 42 by the CPU 25 executing the process, data-time data is embedded in the state data. The large-capacity memory 42 stores a set of data, i.e., the data obtained at the timing from the plurality of detectors and the date/time data indicating when obtained. Further, when the data are obtained at a next cycle, the large-capacity memory 42 similarly stores a suite of the data obtained from the plurality of detectors and the date/time data. This process is repeated until the train radio 79 becomes usable.

When the train radio 79 becomes usable, the CPU 25 operates to fetch the storage data out of the large-capacity memory 42, and the radio signal converter 33 executes a signal conversion. Then, the data are transmitted to the management area 12 from the train 14 by use of the train radio 79. In the management area 12, the data are received by the radio signal converter 56 and saved in the maintenance tool 50.

As explained above, the state-of-device remote monitor system in Embodiment 7 monitors the state of the electric motor 21 mounted in the running train 14, and hence there is less ever-transmitting possibility of the data. This being the case, the data obtained by plurality of detecting operations are stored and then transmitted by utilizing the train radio 79, mounted in the train 14, for the traffic schedule. With this contrivance, the system can be configured at a low cost.

Embodiment 8

Figure 10:
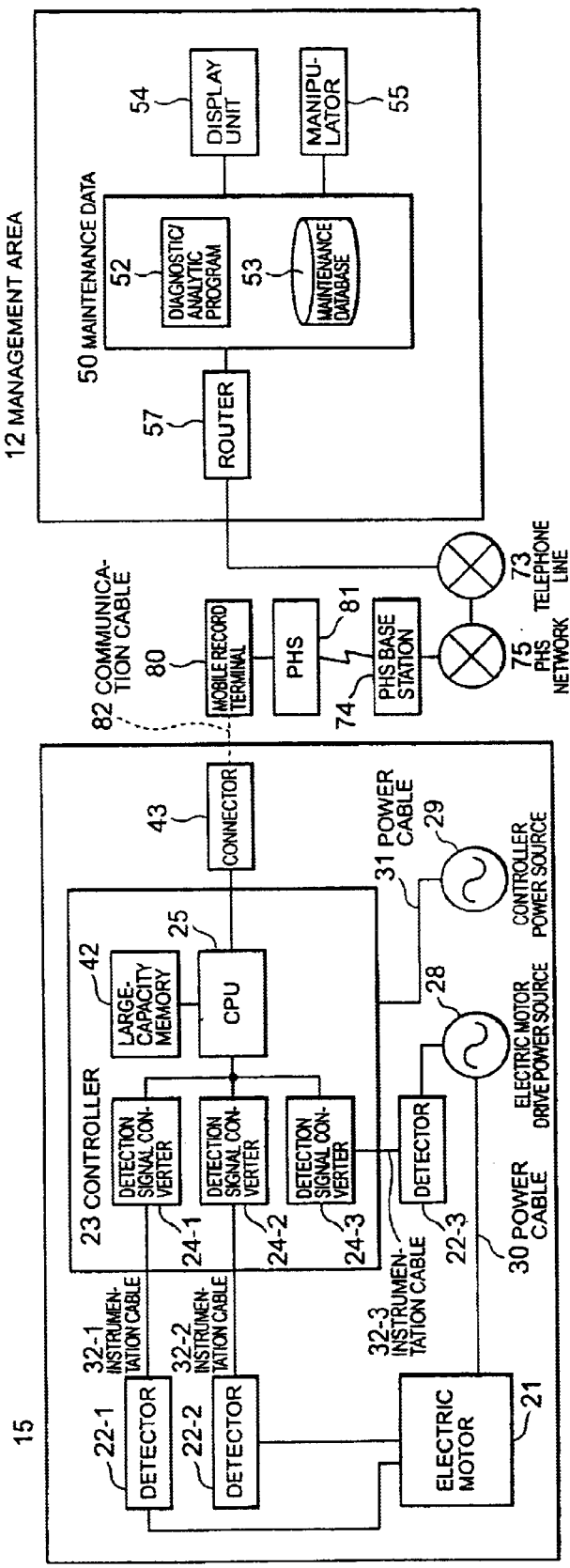
FIG. 10 is a diagram showing an architecture of the state-of-device remote monitor system in Embodiment 8 of the present invention.

FIG. 10 shows an embodiment different from Embodiments 1 through 7 discussed above. The system in Embodiment 7 monitors the state of the electric motor 21 mounted in the train 14 for the duration of running of the train 14. Embodiment 8, however, will deal with a system for monitoring the state of the electric motor 21 mounted in an automobile 15.

A difference in Embodiment 8 from Embodiment 7 is shown as below. An architecture for transmitting the data obtained is configured by a connector 43 enabling a communication cable 82 disconnectable from and connectable to outside, a mobile recording terminal 80 capable of temporarily saving the data, a PHS terminal 81 and a PHS base station 74.

An architecture between the PHS base station 74 and the maintenance tool 50 is configured by a PHS network 75 connected to the PHS base station 74, the telephone line 73 connected to the PHS network 75, and the router 57 connected to the maintenance tool 50.

A different operation in Embodiment 8 from Embodiment 7 is described. The automobile 15 periodically drops in at a service station for refueling the automobile with a fuel such as gasoline and light oil. At this time, the station worker and the like connects the communication cable 82 to the connector 43.

The other end of the communication cable 82 is connected to the mobile recording terminal 80. When a connection between the large-capacity memory 42 and the mobile recording terminal 80 is established, the CPU 25 reads the data from the large-capacity memory 42, and the detection data are downloaded into the mobile recording terminal 80 via the connector 43 and the communication cable 82. When downloading finishes, the communication cable 82 is disconnected, and the data temporarily saved in the mobile recording terminal 80 are transmitted to the maintenance tool 50 via the PHS base station 74, the PHS network 75, the telephone line 73 and the router 57 by use of the PHS 81.

As described above, according to the state-of-device remote monitor system in Embodiment 8, the data are obtained at the service station by utilizing the fact that the automobile 15 drops in at the service station at some interval, and then transmitted to the maintenance tool, whereby the data showing the state of the electric motor mounted in the automobile can be periodically stored in the maintenance tool without using the user's hand.

Embodiment 9

Figure 11:
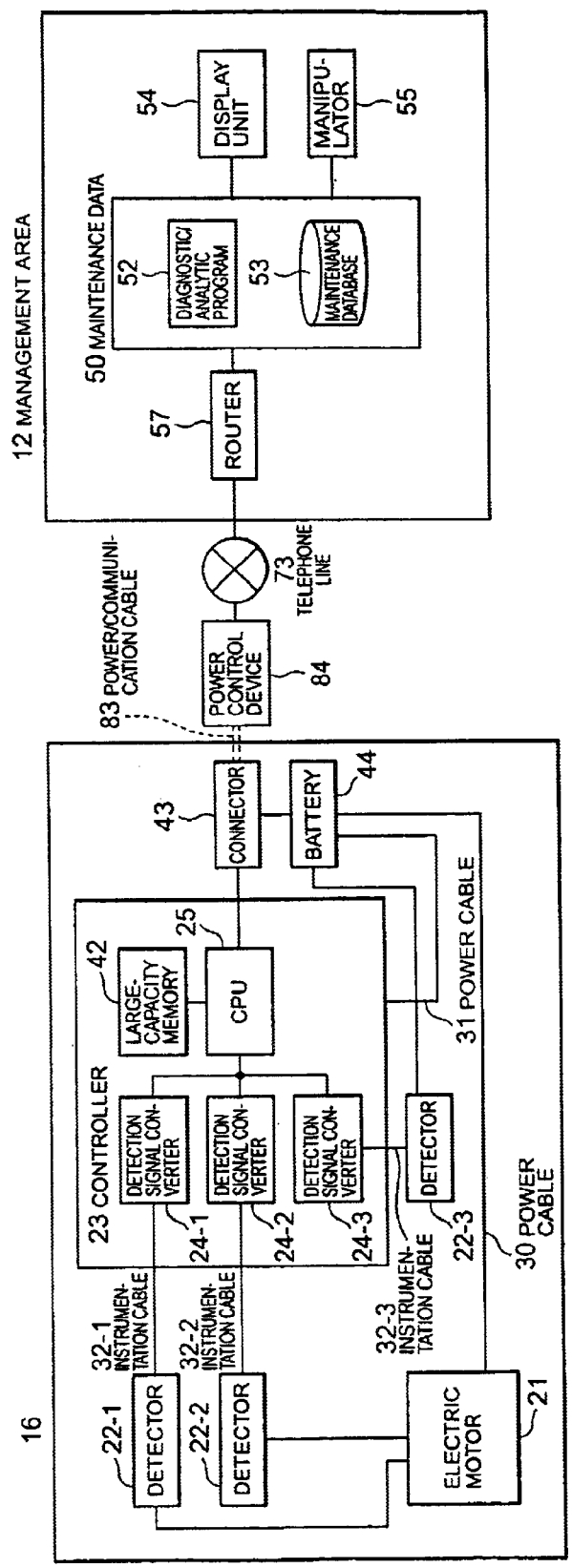
FIG. 11 is a diagram showing an architecture of the state-of-device remote monitor system in Embodiment 9 of the present invention.

FIG. 11 shows a different embodiment of the present invention. The system in Embodiment 8 monitors the state of the electric motor 21 mounted in the automobile. A system in Embodiment 9, however, monitors the state of the electric motor 21 mounted in an electric car 16.

A difference in Embodiment 9 from Embodiment 8 is shown as below. An architecture for transmitting the obtained data is configured by the connector 43 enabling a power/communication cable 83 connectable from outside, a battery 44 connected via a charging circuit to the connector 43, and a power control device 84 to which the other end of the power/communication cable 83 extending from the connector 43 is connected. The power control device 84 is connected via the telephone line 73 and the router 57 to the maintenance tool 50.

A different operation in Embodiment 9 from Embodiment 8 will be explained. The data about the state of the electric motor 21 mounted in the electric car 16 are stored in the large-capacity memory 42 during a run of the electric car 16. The electric car 16, as the automobile needs refueling, needs to charge the battery 44 with the electric power, and on this occasion, the connection of the charging power cable is switched over to the electric car from the power source.

This power cable is combined with the communication cable, and the power/communication cable 83 is connected when charged with the electric power. Then, the battery 44 is charged with the electric power from the power source unit of the power control device 84. Simultaneously, the CPU 25 executes the process, thereby transmitting the data to the maintenance tool 50 from the large-capacity memory 42 via the connector 43, the power/communication cable 83, the power control device 84, the telephone line 73 and the router 57.

As described above, the state-of-device remote monitor system in Embodiment 9 is capable of transferring the data to the maintenance tool with no extra burden upon the user by connecting the power source 44 to the electric car through the cable 83 in order to charge the electric car 16 with the electricity.

Embodiment 10

Figure 12:
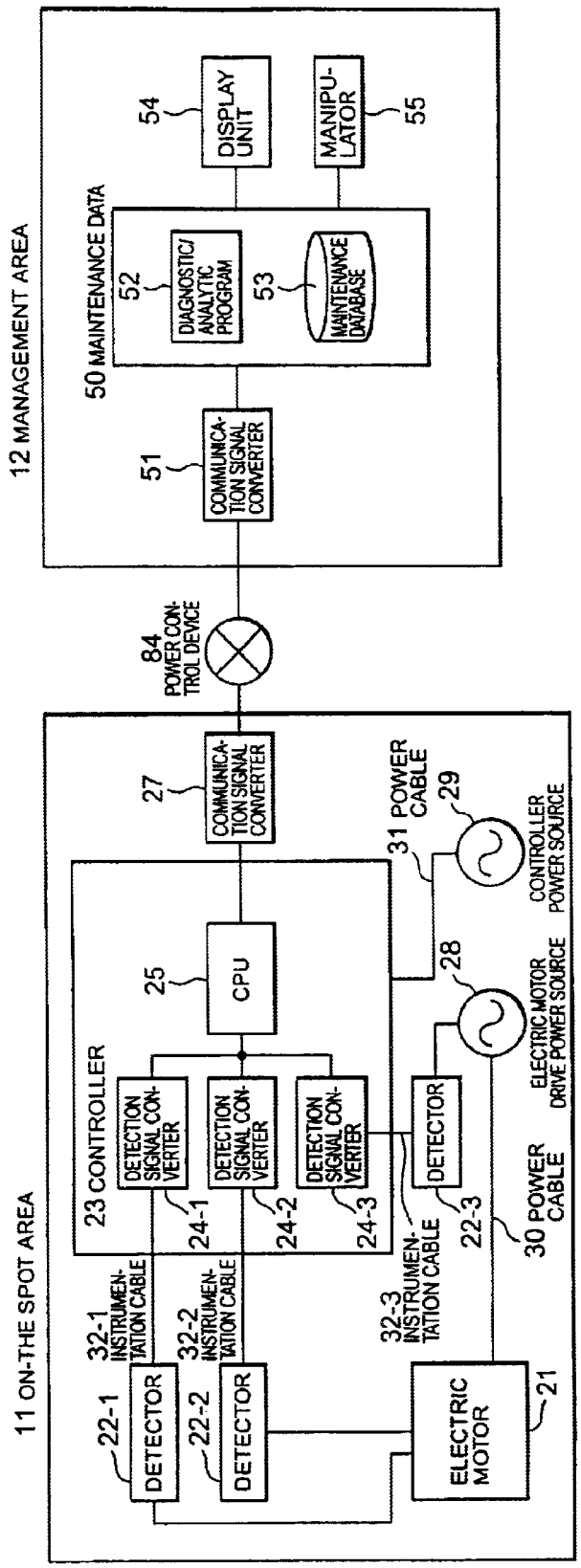
FIG. 12 is a diagram showing an architecture of the state-of-device remote monitor system Embodiments 10 through 12 of the present invention.
Figure 13:
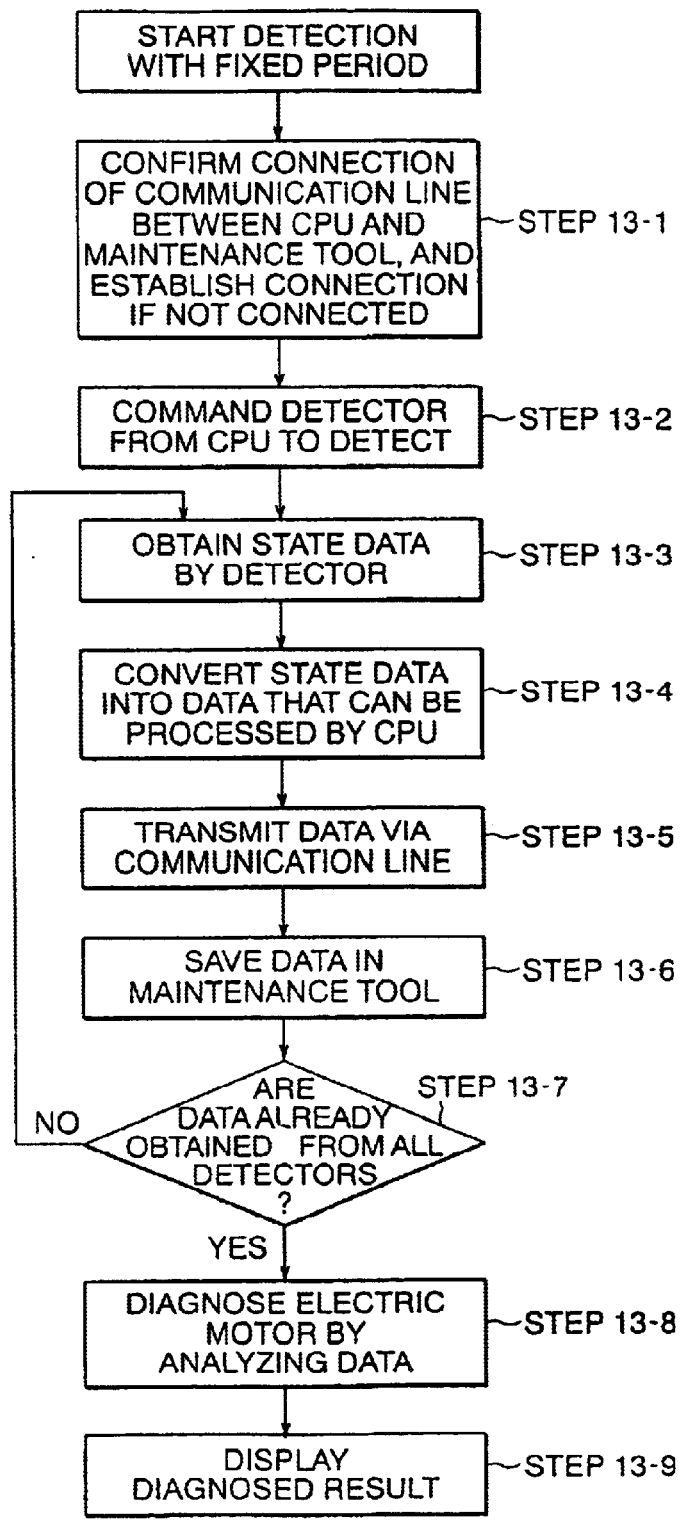
FIG. 13 is a flowchart showing an operation of the state-of-device remote monitor system in Embodiment 10 of the present invention.

FIG. 12 shows an embodiment different from Embodiments 1 to 9. FIG. 13 is a flowchart showing an operation of the system in Embodiment 10.

In Embodiments 1 through 9, the data obtained from the detectors are temporarily stored in the memory 26 or the large-capacity memory 42 in the controller 23, and thereafter transmitted to the maintenance tool. According to Embodiment 10, however, the data obtained therefrom are transmitted directly to the maintenance tool, thus omitting the memory or the large-capacity memory in the controller 23.

A different point of the architecture in Embodiment 10 from Embodiment 1 is that the memory 26 in the controller in Embodiment 1 is omitted. A different operation in Embodiment 10 from that in Embodiment 1 will be explained in depth with reference to a flowchart in FIG. 13.

To start with, in step 13-1, when a detection cycle comes, the CPU 25 in the controller 23 existing in the on-the-spot area 11 confirms whether the CPU 25 is connected to the communication line extending to the maintenance tool 50. A mode of confirming the connection of the communication line differs depending on a type of the line applied to the communication line 78. In the case of the telephone line as in Embodiment 3, however, the connection is established by dial-up access to the communication signal converter 51 from the communication signal converter 27.

Subsequently, in step 13-2, the CPU 25 issues a detection command to the detector 22. In step 13-3, the detector 22 obtains the data about the state of the electric motor 21. Next, in step 13-4, the detection signal converter 24 converts the detection data into a data format that can be processed by the CPU.

In step 13-5, the data converted in step 13-4 are transmitted from the CPU 25 to the maintenance tool 50 via the communication signal converter 27, the communication line 78 and the communication signal converter 51. In step 13-6, the transmitted data are saved in the maintenance tool 50

(the maintenance database 53). It is judged in step 13-7 whether the data saved in the maintenance tool 50 (the database 53) have been already obtained from all the detectors, and the processes steps 13-3 through 13-6 are repeatedly executed till the data are obtained from all the detectors.

As a result, in step 13-8, the data obtained from the detector 22 are saved in the maintenance tool, and hence the state of the electric motor 21 is analyzed based on these pieces of data. In step 13-9, a diagnostic result is displayed on the display unit 54.

As explained above, according to the state-of-device remote monitor system in Embodiment 10, the controller 23 has no necessity of having the memory for temporarily recording the data, so that the controller 23 installed in the on-the-spot area 11 can be manufactured at a still less cost.

Embodiment 11

Figure 14:
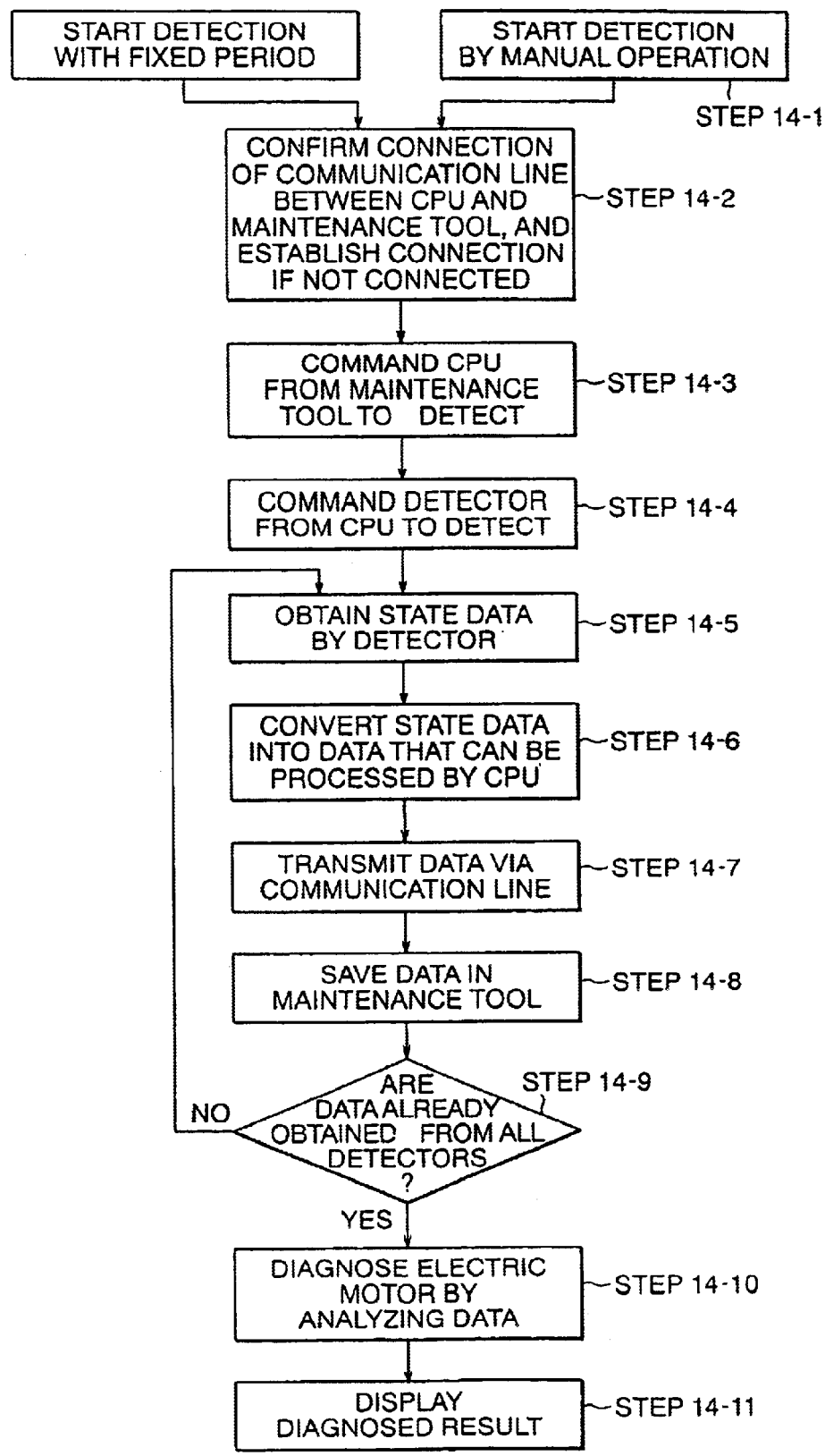
FIG. 14 is a flowchart showing an operation of the state-of-device remote monitor system in Embodiment 11 of the present invention.

FIG. 14 is a flowchart showing an operation in an embodiment different from Embodiments 1 through 10. Note that the system architecture as shown in FIG. 11 is the same as that in Embodiment 10.

According to Embodiment 10, the controller 23 in the on-the-spot area 11 performs the fixedly periodic management, and, at the time of detection, the CPU 25 in the controller 23 issues the first command. According to Embodiment 11, however, the maintenance tool 50 performs the fixedly periodic management and issues the first command, i.e., the state-of-device detection start command.

The operation in Embodiment 11 will be described referring to FIG. 14. In step 14-1, the maintenance tool 50 implements the fixedly periodic management and outputs the state-of-device detection start command when reaching a timing of detecting the state of the device.

In step 14-2, the maintenance tool 50 confirms whether the communication line 78 is connected to the controller 23 that corresponds to the target electric motor 21. If the communication line 78 is not connected, the connection is to be established. In step 14-3, after the connection has been established, the maintenance tool 50 commands the CPU 25 to detect.

Upon receiving this command, in step 14-4, the CPU 25 commands the detector 22 to obtain the data about the device state. Subsequently, in steps 14-5 to 14-8, the data obtained by the detectors 22 are converted by the detection signal converter 24, and thereafter the CPU 25 saves the converted data in the maintenance database 53 in the maintenance tool 50 trough the communication signal converter 27, the communication line 78 and the communication signal converter 51.

In step 14-9, it is judged whether the data saved in the maintenance database 53 have been obtained from all the detectors. The processes in steps 14-5 through 14-8 are repeatedly executed till the data are obtained from all the detectors.

As a result, in step 14-10, the data obtained by the detector 22 are saved in the maintenance tool, the state of the electric motor 21 is analyzed based on these pieces of data. In step 14-11, the diagnostic result is displayed on the display unit 54.

When the data are obtained from all the detectors, the diagnostic/analytic program 52 runs to diagnose the electric motor by analyzing the data, and the result is displayed on the display unit 54.

Note that the maintenance tool 50 issues the first command to obtain the state monitor data in Embodiment 11, and hence the maintenance worker may start the detection by the manual operation without being limited to the fixedly periodic data extraction.

As discussed above, according to the state-of-device remote monitor system in Embodiment 11, the maintenance tool 50 confirms the state of the connection of the communication line, and therefore, unlike the connection from the controller 23 side, the maintenance tool 50 can monitor a state of line activity. Accordingly, if there are a multiplicity of controllers 23, the line activity can be made efficient.

Further, when the maintenance worker desires to re-conform the data, the maintenance tool 50 issues a command to obtain the data once again for diagnosing the electric motor, thereby making it possible to obtain the state of the electric motor at an arbitrary time.

Embodiment 12

Figure 15:
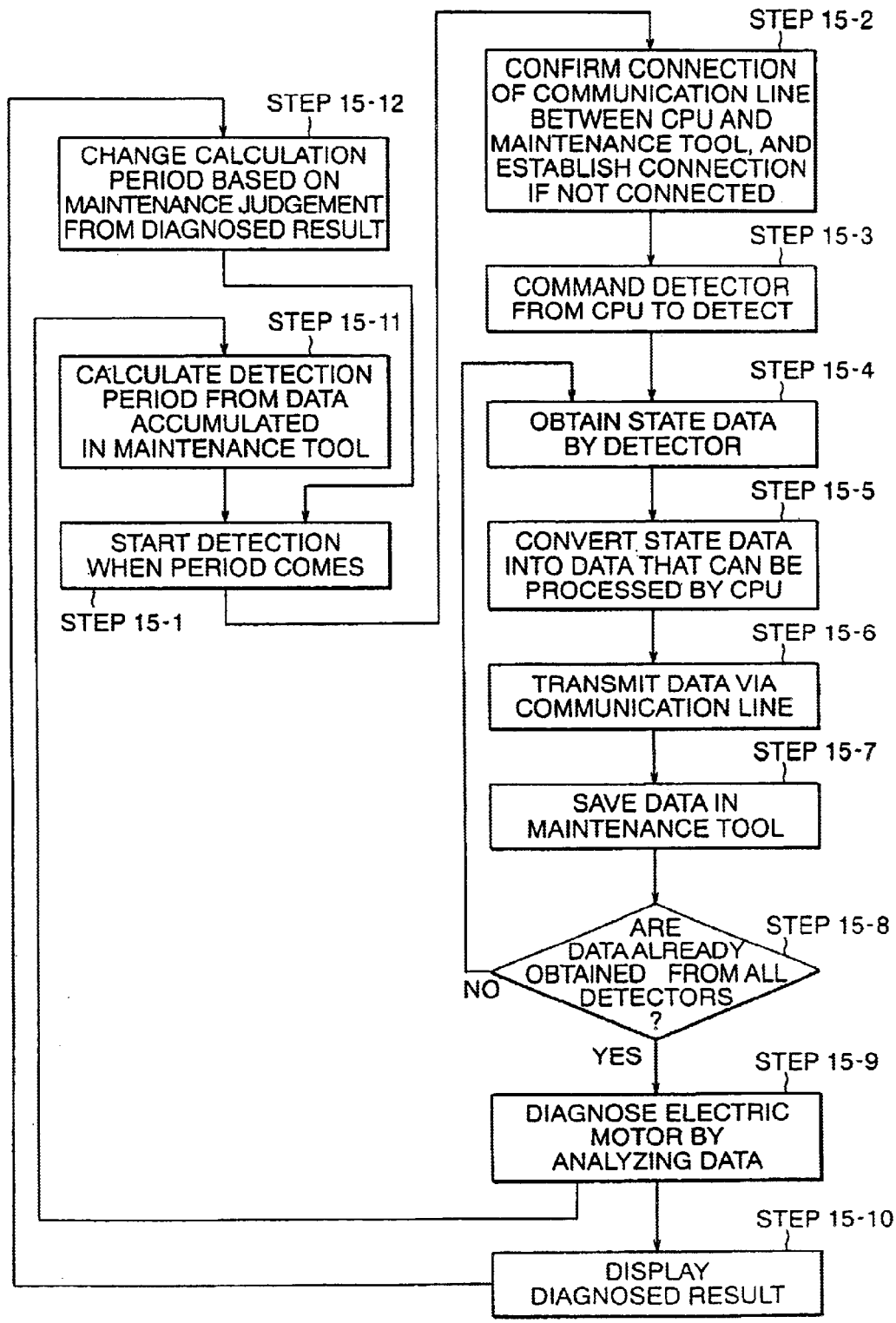
FIG. 15 is a flowchart showing an operation of the state-of-device remote monitor system in Embodiment 12 of the present invention.

FIG. 15 shows an embodiment different from Embodiments 1 to 10 discussed above. Note that the architecture is the same as that in Embodiment 10 and is illustrated in FIG. 11.

FIG. 15 is a flowchart showing an operation in Embodiment 12. Note that the architecture in Embodiment 12 is the same as that in each of Embodiments 10, 11 and is illustrated in FIG. 11.

In Embodiment 11, the state monitor data from the detector 22 corresponding to the target electric motor 21 are obtained from the maintenance tool 50 in the management area with a fixed period, however, since the maintenance tool 50 issues the first command to obtain the state monitor data, the maintenance tool 50 changes the detection period after confirming the state of the electric motor. Further, the maintenance tool 50 automatically judges that a change occurs in the state of the electric motor and automatically changes the detection period.

An operation in Embodiment 12 will be explained referring to FIG. 15. In step 15-1, the maintenance tool 50 outputs the first command to obtain the state monitor data. Subsequent steps 15-2 to 15-9 for obtaining and analyzing the data and diagnosing the electric motor are the same as steps 14-2 to 14-10 in Embodiment 11, and therefore their repetitive explanations are omitted.

Thereafter, in step 15-10, the diagnosed result is displayed on the display unit 54. Then, in step 15-11, a changed in the detection period is calculated based on the data stored so far in the maintenance database 53 of the maintenance tool 50.

Herein, if the diagnosed result obtained by comparing the obtained state monitor data with model data of the device concerned becomes worse than the diagnosed result in the past, it can be considered that the state of the device declines. An electric device such as the electric motor does not require an immediate maintenance simply because the state monitor data is slightly worsened. A timing for the maintenance is determined while monitoring the state for some period of time. Further, the decline in the data is merely shown once, and the device might be recovered to its normal state in some cases. Therefore, in step 15-12, if the maintenance tool 50 judges from the diagnosed result that the state of the device worsens, the inspection period is set short.

Moreover, the maintenance worker, when confirming the diagnosed result displayed on the display unit 54, may set the inspection period comparatively long if good in the state of the electric motor 21 and comparatively short if worsened, and may further change the inspection period for other purposes.

As discussed above, the state-of-device remote monitor system in Embodiment 12 is capable of monitoring the state of the electric motor with a much higher accuracy because of being able to automatically or manually change the inspection period upon receiving the diagnosed result from the maintenance tool 50.

Embodiment 13

Figure 16:
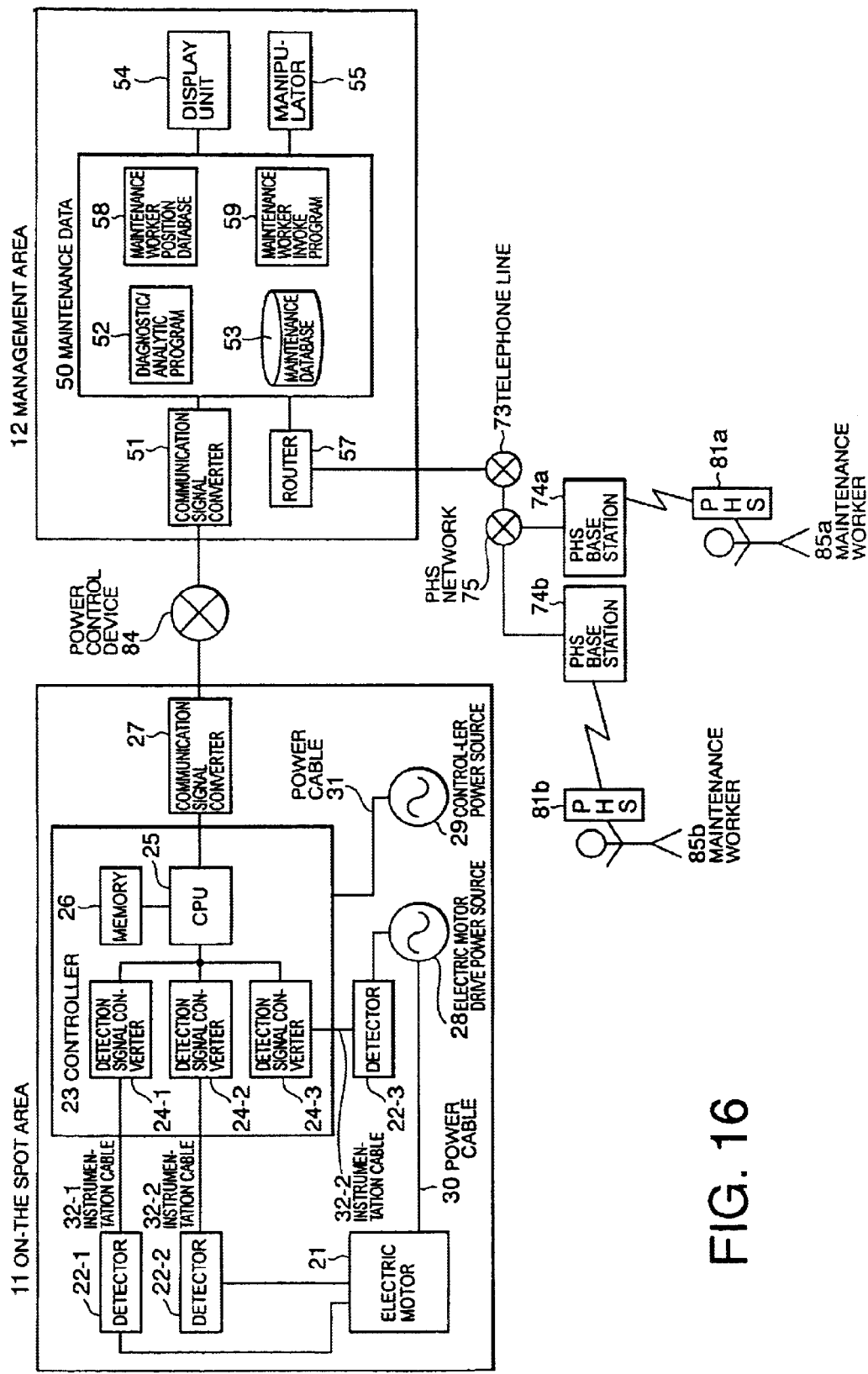
FIG. 16 is a diagram showing an architecture of the state-of-device remote monitor system Embodiment 13 of the present invention.
Figure 17:
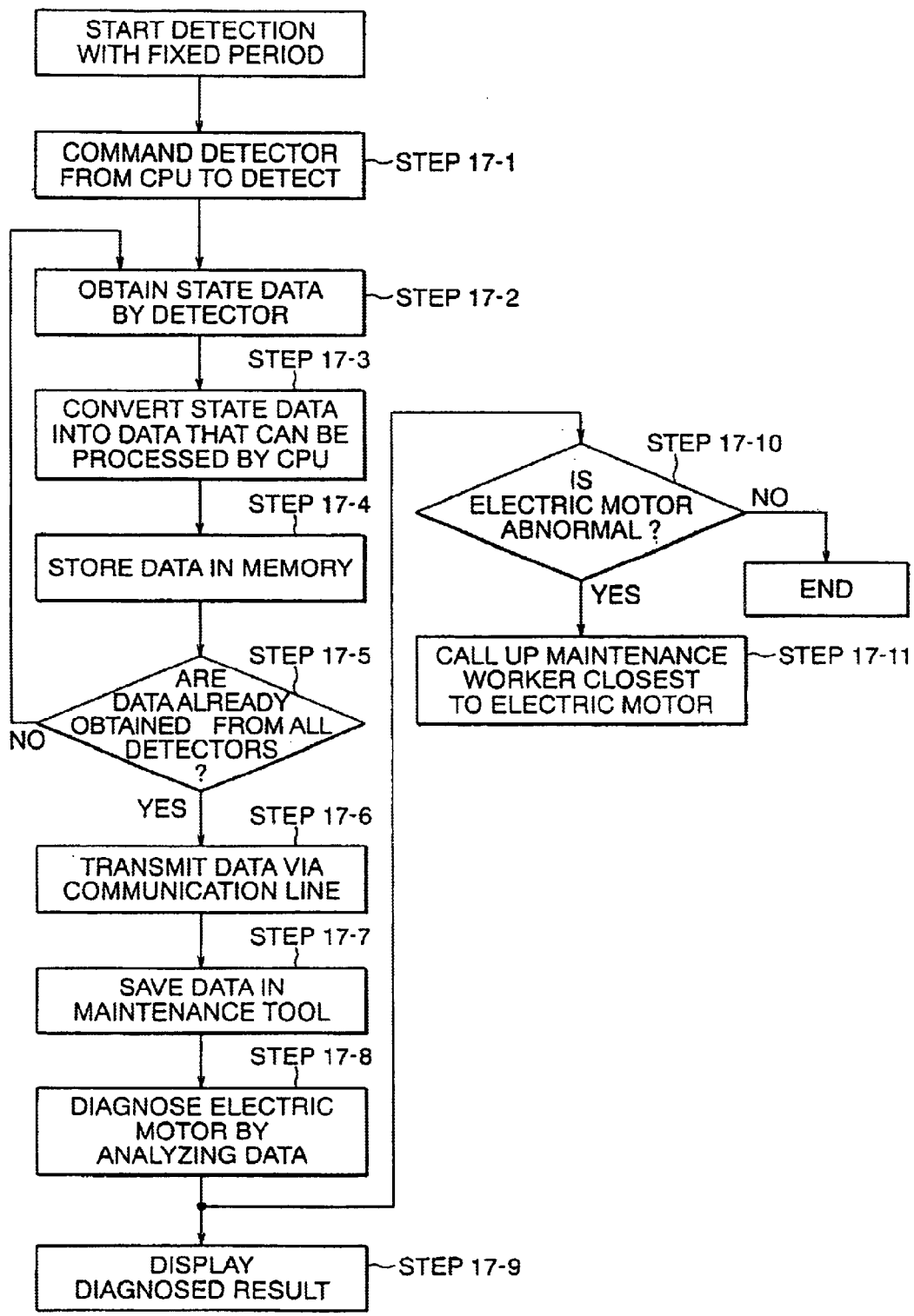
FIG. 17 is a flowchart showing an operation of the state-of-device remote monitor system in Embodiment 13 of the present invention.

FIG. 16 shows an embodiment different from Embodiments 1 through 12 discussed above. FIG. 17 is a flowchart showing an operation of the state-of-device remote monitor system in Embodiment 13.

According to Embodiments 1 through 11, the diagnosed result is given to the maintenance worker by displaying on the display unit 54 the state of the electric motor 21 that is diagnosed by the maintenance tool 50. In Embodiment 13, however, a function of invoking the maintenance worker through a PHS 81 is added to the display function on the display unit 54.

The architecture in Embodiment 13 is that the maintenance tool 50 includes a maintenance worker position database 58 and a maintenance worker invoke program 59 in addition to the diagnostic/analytic program 52 and the maintenance database 53. The maintenance tool 50 is connected to the PHS 81 possessed by a maintenance worker 85 via the router 57, the telephone line 73, the PHS network 75 and the PHS base station 74.

A different operation in Embodiment 13 from Embodiment 1 discussed above will be explained with reference to a flowchart in FIG. 17. Steps 17-1 through 17-8 in which the state monitor data are transmitted to and analyzed and diagnosed by the maintenance tool 50, are the same as steps 2-1 through 2-8 in FIG. 2 in Embodiment 1.

In step 17-9, the diagnosed result is displayed on the display unit 54. It is judged from the diagnosis in step 17-10 whether the electric motor 21 is abnormal. If judged to be abnormal, the maintenance worker 85 is called up through the PHS 81 in step 17-11.

Note that a position of the maintenance worker 85 is transmitted via the PHS 81 to the maintenance worker position database 58 as the occasion demands, and the maintenance worker invoke program 59 searches for the maintenance worker 85 nearest to the location of the electric motor 21, and this maintenance worker 85 is invoked.

As explained above, according to the state-of-device remote monitor system in Embodiment 13, the diagnosis tool for the electric motor 21 and the maintenance worker invoke tool are combined into a system, whereby an arrival time taken until the maintenance worker arrives at the electric motor since the abnormality has occurred on the electric motor 21, can be reduced because of no intermediary person other than the maintenance worker.

Embodiment 14

Figure 18:
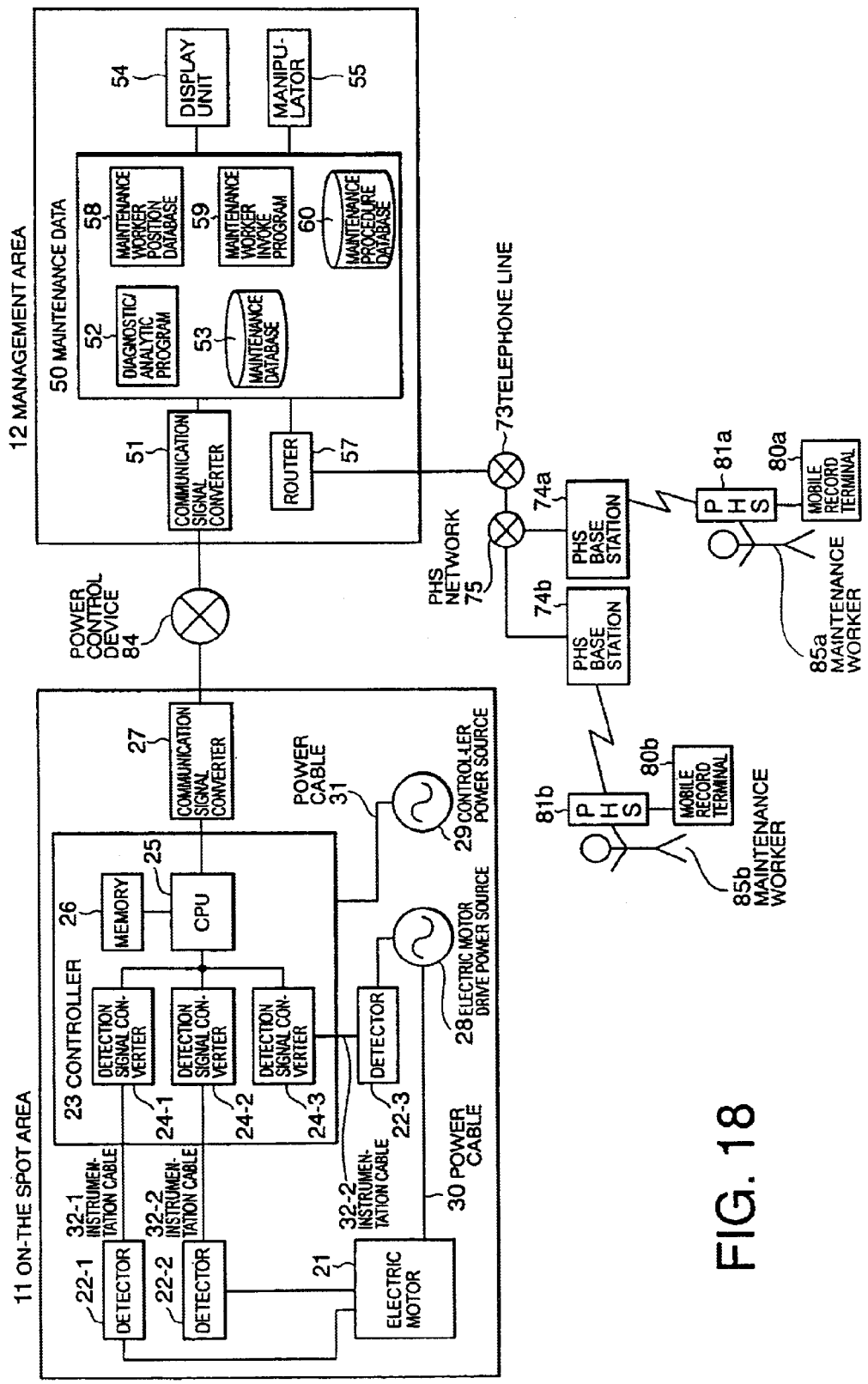
FIG. 18 is a diagram showing an architecture of the state-of-device remote monitor system in Embodiment 14 of the present invention.
Figure 19:
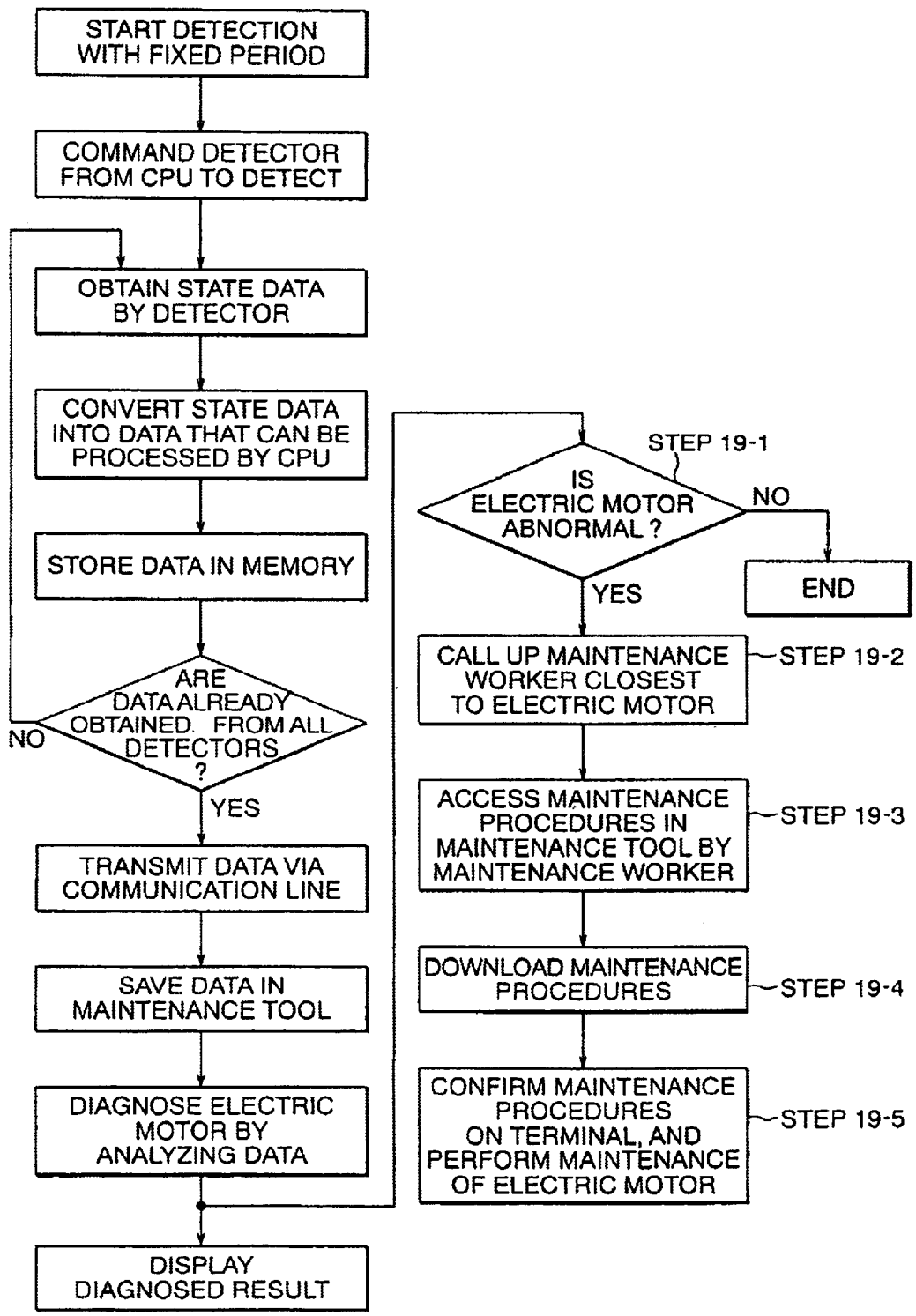
FIG. 19 is a flowchart showing an operation of the state-of-device remote monitor system in Embodiment 14 of the present invention.

FIG. 18 shows an embodiment different from Embodiments 1 to 13 discussed above. FIG. 19 is a flowchart showing an operation of the state-of-device remote monitor system in Embodiment 14.

In Embodiment 13, the maintenance worker 85 is called up through the PHS 81b. According to Embodiment 14, however, the maintenance worker 85 carries the mobile record terminal 80, and the maintenance of the electric motor 21 is conducted based on the information recorded on the mobile record terminal 80.

In the architecture in Embodiment 14, the maintenance tool 50 includes a maintenance procedure database 60 storing maintenance procedures corresponding to presumed events with respect to all the maintenance target devices. Further, the maintenance worker 85 carries the mobile record terminal 80 capable of communicating with the maintenance tool 50 upon being connected to the PHS 81b.

An operation in Embodiment 14 will be described with reference to a flowchart in FIG. 19. In step 19-1, the maintenance tool 50 checks based on the diagnostic/analytic program 52 whether the electric motor 21 is abnormal. As a result, if confirming that the electric motor 21 is abnormal, in step 19-2, the maintenance worker 85 existing in the closest proximity to the electric motor 21 is invoked. Note that what has been done so far is the same as that in Embodiment 12.

Next, in step 19-3, the maintenance worker 85 called up accesses the maintenance procedure database 60 in the maintenance tool 50 by use of the PHS 81b from the mobile record terminal 80b. Subsequently in step 19-4, the maintenance procedures are downloaded into the mobile record terminal 80b, and the maintenance worker 85 performs the maintenance of the electric motor 21 in accordance with the procedures displayed on the mobile record terminal 80b in step 19-5.

As discussed above, according to the state-of-device remote monitor system in Embodiment 14, the maintenance worker 85 is able to, on the assumption that the maintenance worker 85 has the basic know-how of the maintenance of the electric motor 21, perform the maintenance in a way that refers to the maintenance procedure manual. Hence, the immediate maintenance of the electric motor 21 can be attained because of an omission of the time to go and take the maintenance manual after the abnormality has occurred on the electric motor 21.

Embodiment 15

Figure 20:
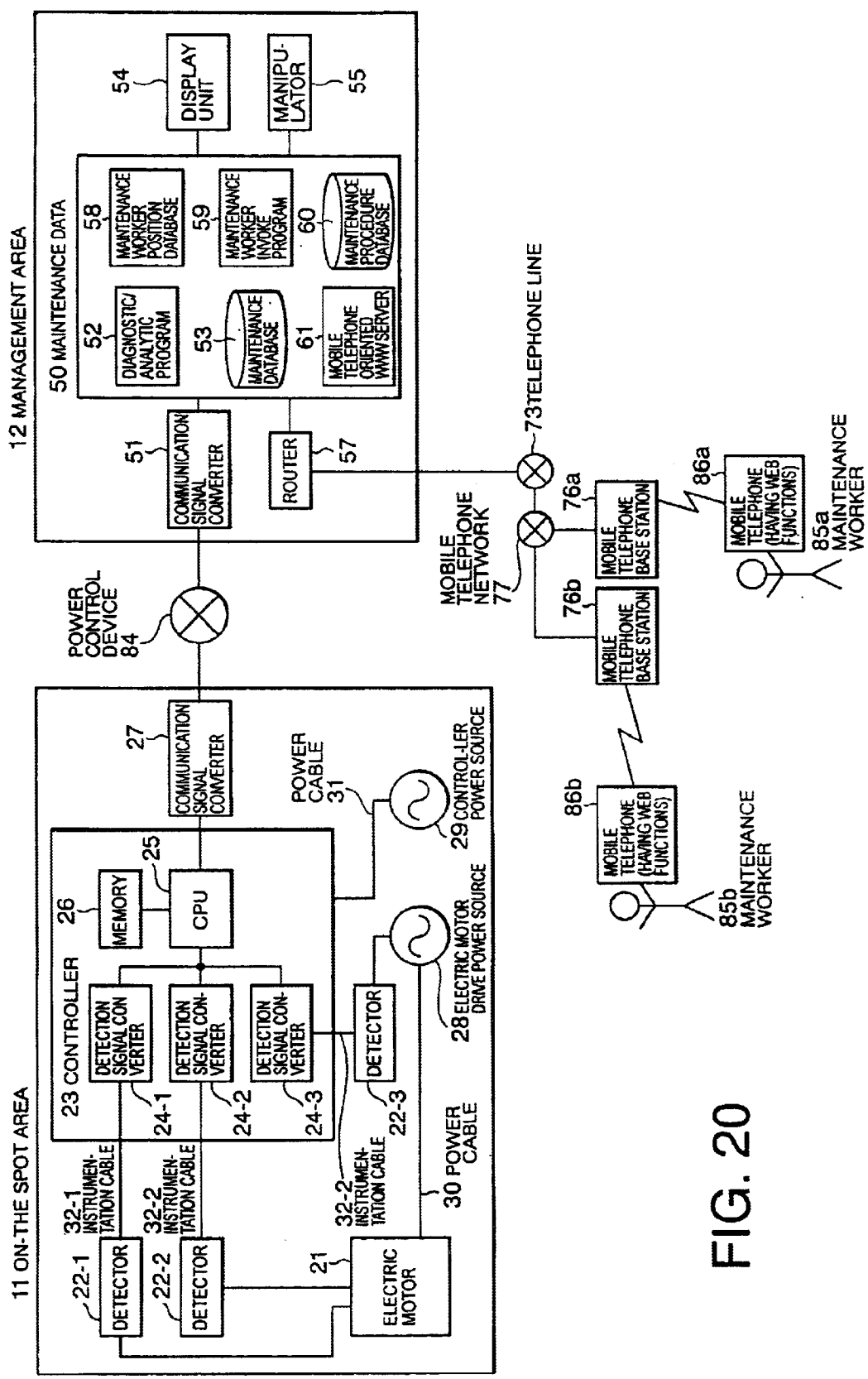
FIG. 20 is a diagram showing an architecture of the state-of-device remote monitor system in Embodiment 15 of the present invention.

FIG. 20 shows an embodiment different from Embodiments 1 through 14 discussed above. The operating procedures are the same as those of the flowchart shown in FIG. 19 in Embodiment 14.

In Embodiment 14, the maintenance procedure data are confirmed on the mobile record terminal 80b possessed by the maintenance worker 85. According to Embodiment 15, however, the maintenance procedures are displayed on the mobile telephone having the Web functions or the PHS 86b with the Web functions, whereby the maintenance worker 85 can take the technical action simply by carrying only the mobile telephone even if the maintenance worker 85 does not carry the mobile record terminal 80b at all times.

The architecture in Embodiment 15 is that the maintenance tool 50 includes a mobile telephone-oriented Web sever 61, and the mobile telephone 86 possessed by the maintenance worker 85 incorporate the Web functions.

Next, the operation in Embodiment 15 is that the maintenance worker 85 in charge of the maintenance of the electric motor 21 implements the maintenance of the electric motor 21 in accordance with the configuration of the procedures displayed on the mobile telephone 86b.

As discussed above, according to the state-of-device remote monitor system in Embodiment 15, if all the on-duty maintenance workers are, if the abnormality occurs on the electric motor 21, unable to take the technical actions due to other works to be done, an off-duty maintenance worker 85 is invoked for taking an immediate technical action.

Embodiment 16

Figure 21:
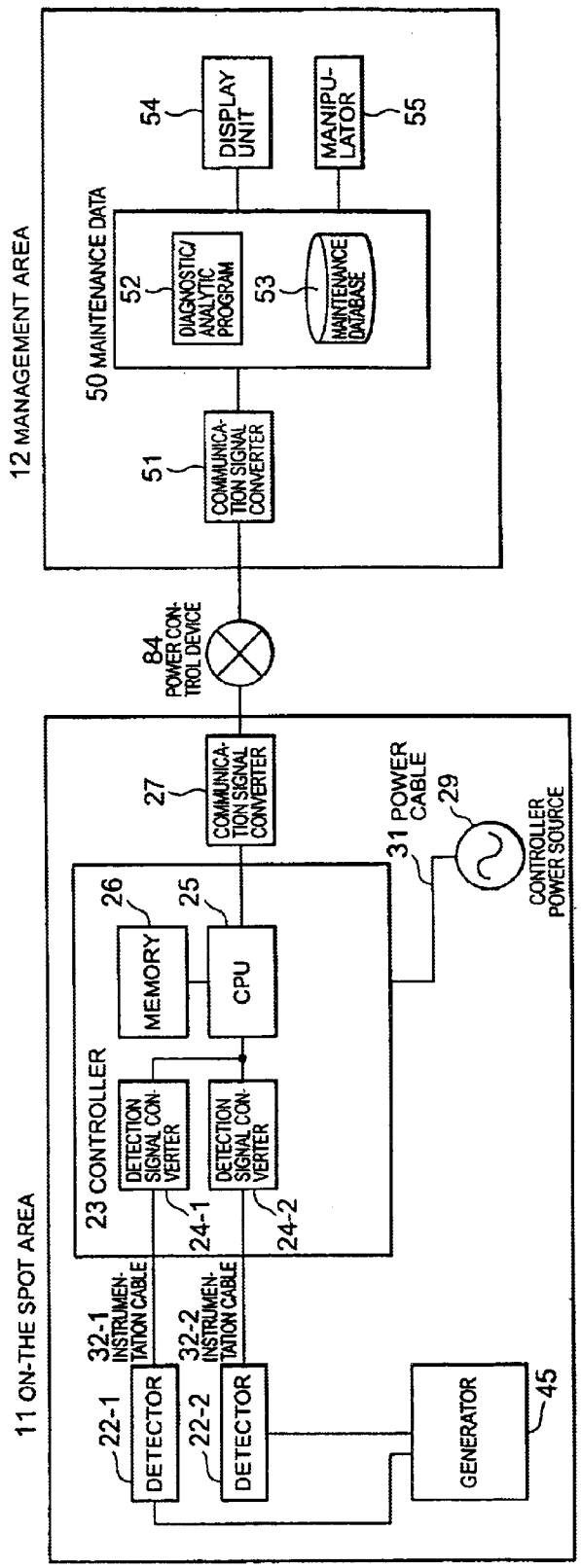
FIG. 21 is a diagram showing an architecture of the state-of-device remote monitor system in Embodiment 16 of the present invention.

FIG. 21 shows an embodiment different from the embodiments discussed above. In Embodiments 1 through 15, the state-of-device remote monitor system for the electric motor as the monitor target device has been discussed. A state-of-device remote monitor system for a generator 45 can be also provided, wherein the detector 22 for the generator is fitted, and the diagnostic/analytic program 52 is structured as a generator 45 oriented program.

The detector 22 for the generator 45 is basically the same as the detector for the electric motor 21 and may be the vibration meter, the RTD, the thermocouple, the CT and PT. Further, the acquisition of an operating state of the generator 45 involves the use of a protective relay corresponding to switching states of a generator load switch and a main transformer breaker, a switching state of a field circuit breaker, a short-circuit of an armature winding, a line-to-ground fault of the armature winding, and a field loss.

The controller 23 obtains all pieces of data from those detectors and transmits the same data to the maintenance tool 50 in the management area 12. The data are analyzed by the diagnostic/analytic program 52 for the generator and displayed on the display unit 54.

As explained above, the state-of-device remote monitor system in Embodiment 16 is capable of monitoring the generator 45 as well as the electric motor 21 by using the generator-oriented detectors and diagnostic/analytic program. Similarly, the system is capable of monitoring a transformer and other electric devices in addition to the electric motor 21 and the generator 45 by use of target device oriented detectors and diagnostic/analytic programs.

Embodiment 17

Figure 22:
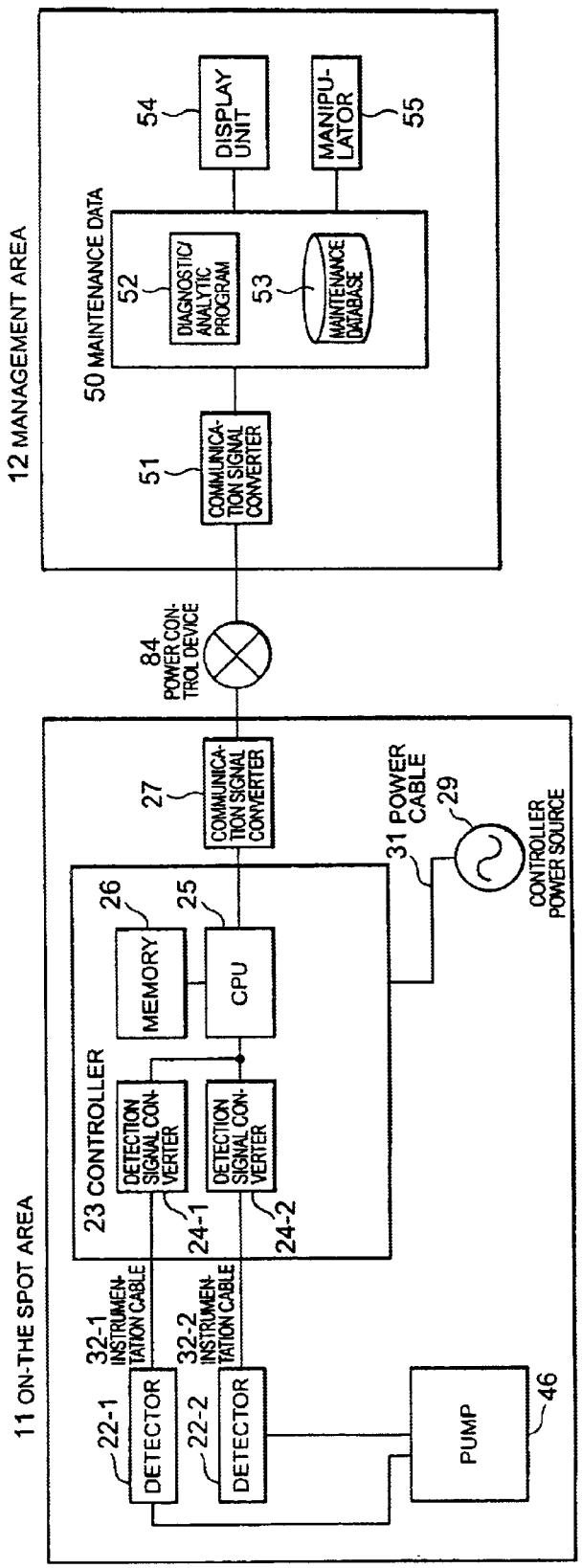
FIG. 22 is a diagram showing an architecture of the state-of-device remote monitor system in Embodiment 17 of the present invention.

FIG. 22 shows an embodiment different from Embodiments 1 through 16. The state-of-device remote monitor systems have been described so far, wherein the monitor target device is the electric motor in Embodiments 1 through 15 and the generator 45 in Embodiment 16. A state-of-device remote monitor system for a pump 46 can be also provided, wherein the detector 22 for the pump is fitted, and the diagnostic analytic program 52 is structured as a pump 46 oriented program.

The detector 22 for the pump 46 may be the vibration meter, the RTD and the thermocouple. The controller 23 obtains all pieces of data from those detectors and transmits the same data to the maintenance tool 50 in the management area 12. The data are analyzed by the diagnostic/analytic program 52 for the pump and displayed on the display unit 54.

As explained above, the state-of-device remote monitor system in Embodiment 17 is capable of monitoring the pump 46 in addition to the electric devices such as the electric motor 21 and the generator 45 by using the pump-oriented detectors and diagnostic/analytic program. Similarly, the system is capable of monitoring mechanical devices such as a turbine, a compressor and so on by use of target device oriented detectors and diagnostic/analytic programs.

Embodiment 18

Figure 23:
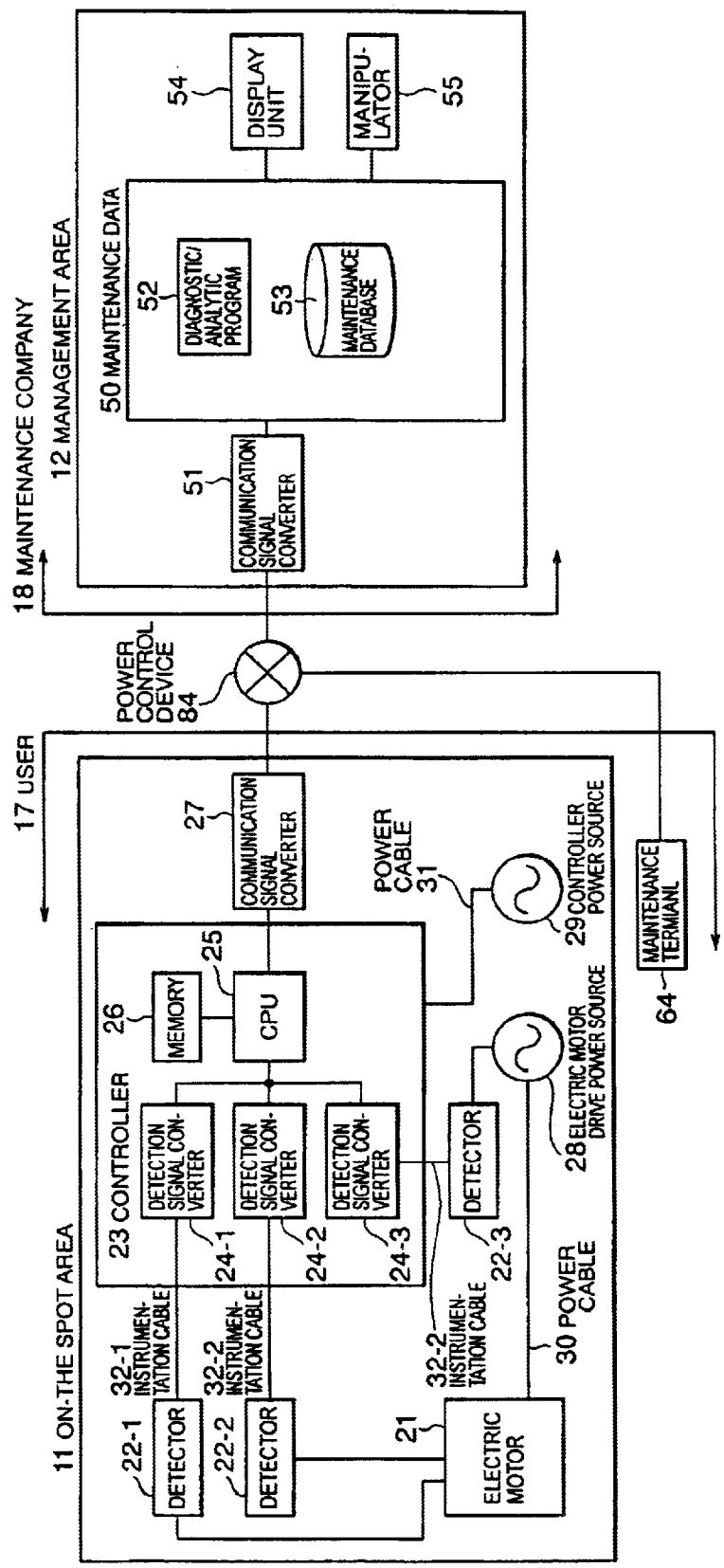
FIG. 23 is a diagram showing an architecture of the state-of-device remote monitor system in Embodiment 18 of the present invention.

FIG. 23 shows an embodiment different from the embodiments discussed above. In Embodiments 1 through 16, the electric motor 21 belongs to the maintenance worker 85 who remote-monitors the state of the electric motor 21. A maintenance company 18 for the electric motor 21 has the maintenance tool 50 and can perform the remote-maintenance of the electric motor 21 possessed by a user 17.

An architecture in Embodiment 18 will be explained. the architecture in the on-the-spot area 11 is the same as that in Embodiment 1, and the architecture in the management area 12 is also the same as that in Embodiment 1. The on-the-spot area 11 is possessed by the user 17, and the management area 12 is possessed by the maintenance company 18. The user 17 has a maintenance terminal 64 connected to the communication line 78.

An operation in Embodiment 18 will be explained. the electric motor 21 is diagnosed by the maintenance tool 50 possessed by the maintenance company 18 periodically or as the necessity may arise. A diagnosed result is registered in the maintenance database 53, and the system on the side of the maintenance company can read the data about the diagnosed result on the display unit 54. Further, the system on the user side obtains the maintenance data about the electric motor 21 from the maintenance database 53 by accessing the database 53 in the maintenance tool 50 belonging to the maintenance company 18 via the communication line 78 from a maintenance terminal 64, then displays the same data on the maintenance terminal 64 and is thus able to monitor the state of the electric motor 21.

As described above, according to the state-of-device remote monitor system in Embodiment 18, the maintenance company 18 possesses the maintenance tool 50, with the result that the user 17 has no necessity of performing the maintenance of the maintenance tool 50. The maintenance of the maintenance tool 50 involves not only the maintenance of the equipment but also updating the diagnostic/analytic program and the maintenance of the maintenance database 53 stored with the old data. Moreover, the maintenance company 18 conducts the maintenance works given from a plurality of users 17 and therefore can accumulate a large quantity of state-of-device data, with the result that the company 18 is capable of doing a highly-accurate diagnosis.

Embodiment 19

Figure 24:
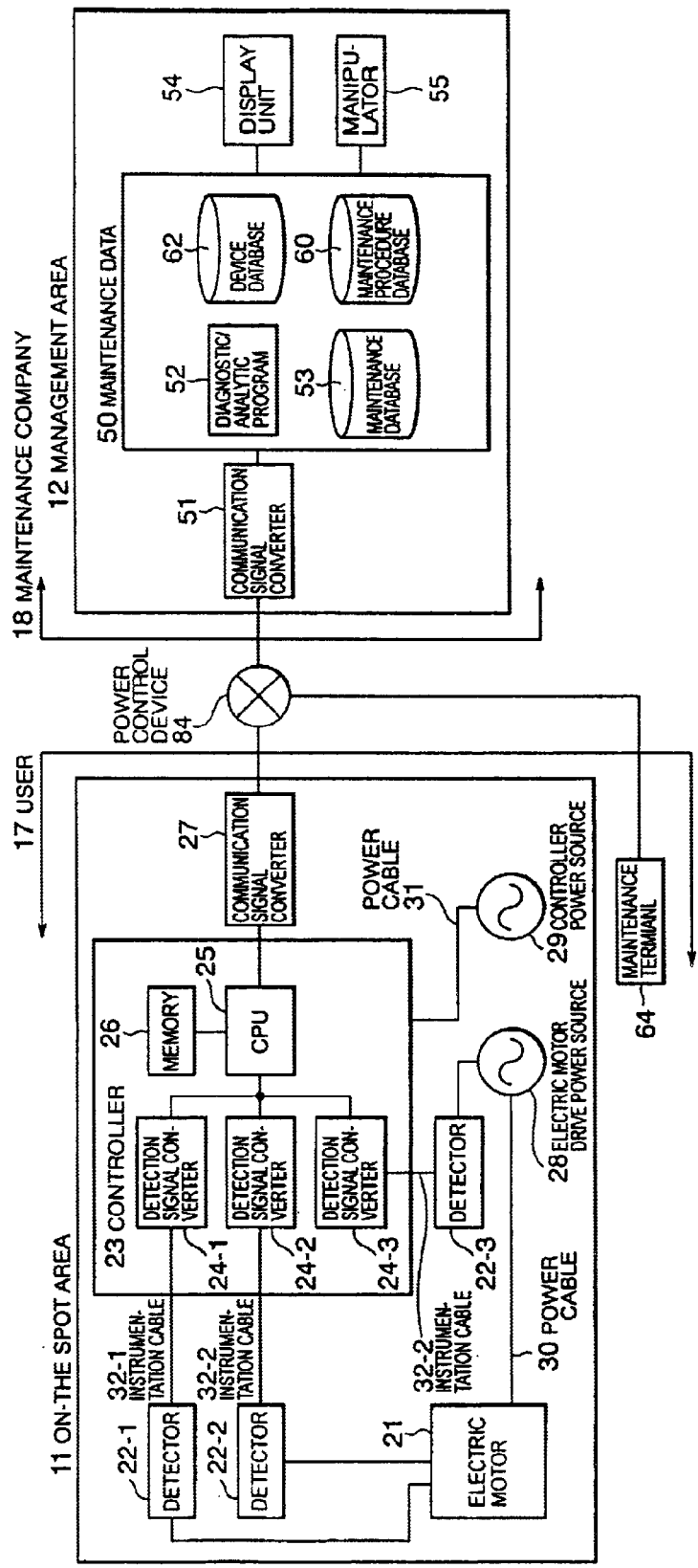
FIG. 24 is a diagram showing an architecture of the state-of-device remote monitor system in Embodiment 19 of the present invention.

FIG. 24 shows an embodiment different from Embodiments 1 to 18. The user 17 is provided with the diagnosed result of the state of the electric motor 21 in Embodiment 17. According to Embodiment 19, however, the user 17 is provided with the maintenance procedures corresponding to the diagnosed result and the data about the electric motor 21 as well.

An architecture in Embodiment 19 is, the user 17 sided architecture being the same as that in Embodiment 17, that the maintenance tool 50 possessed by the maintenance company 18 further incorporates a device database 62 and a maintenance procedure database 60.

Next, an operation in Embodiment 19 will be explained. The electric motor 21 is diagnosed by the maintenance tool 50 possessed by the maintenance company 18. If something abnormal is confirmed in the diagnosed result, an alarm is displayed on the maintenance terminal 64 possessed by the user 17 as well as on the display unit 54 possessed by the maintenance company 18.

The maintenance worker 85 accesses the maintenance procedure database 60 to obtain the data about the electric motor 21 identified by the alarm and the maintenance procedures corresponding to this abnormal state. Further, detailed pieces of data about the device can be obtained by accessing the device database 62.

As discussed above, according to the state-of-device remote monitor system in Embodiment 19, the user 17 is able to obtain the maintenance procedures of the electric motor 21 and the device data in a way that sees the screen on the maintenance terminal 64 without referring to documents such as an instruction manual and specifications. Therefore, the works on the side of the user 17 can be rationalized, and the maintenance of the electric motor 21 can be promptly conducted.

Embodiment 20

Figure 25:
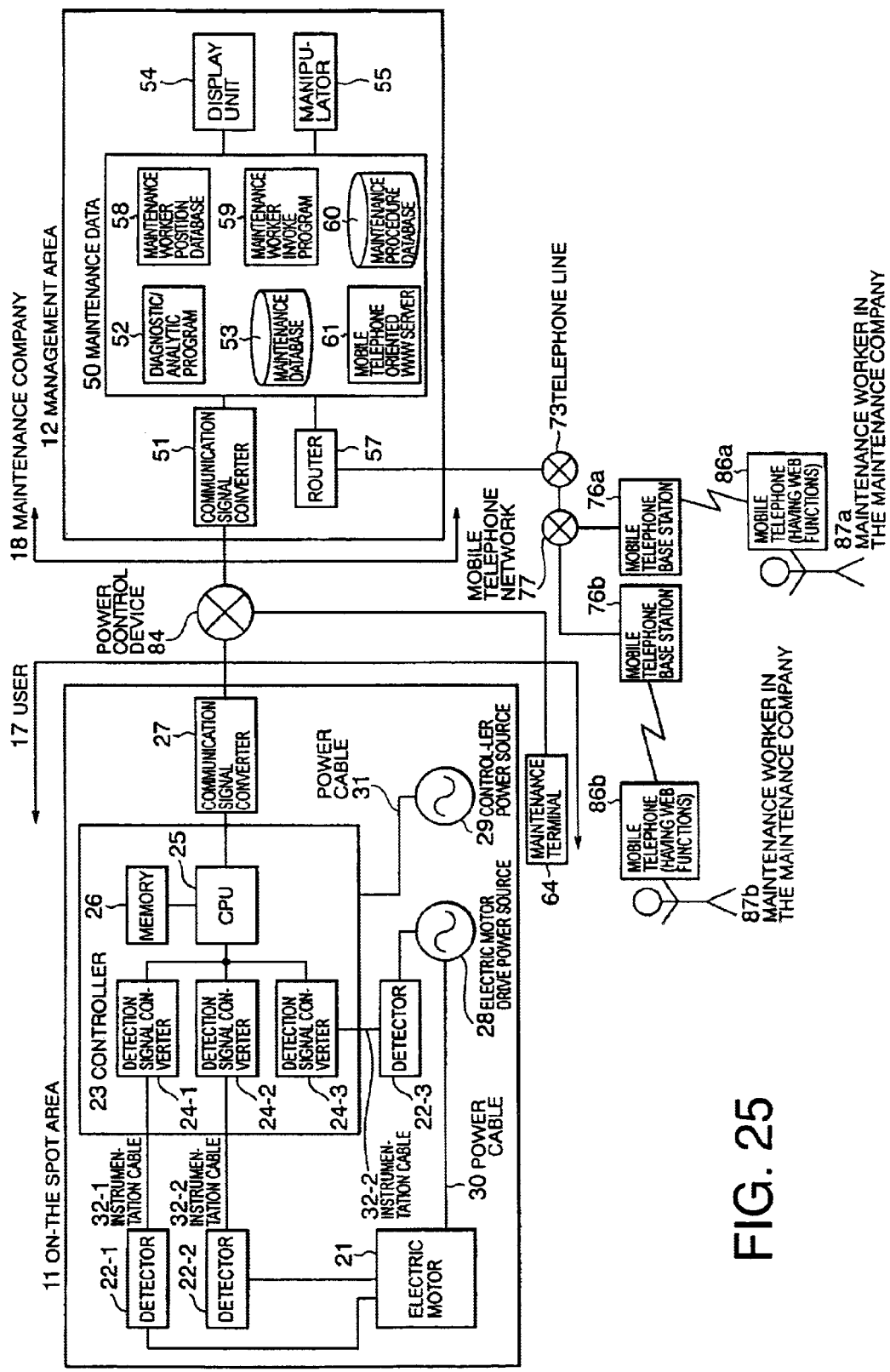
FIG. 25 is a diagram showing an architecture of the state-of-device remote monitor system in Embodiment 20 of the present invention.

FIG. 25 shows an embodiment different from Embodiments 1 through 19 discussed above. Embodiment 18 has exemplified the case where the user 17 is provided with the data about the state of the electric motor 21 and the maintenance procedures, and performs the maintenance. According to Embodiment 20, however, the maintenance worker 87 in the maintenance company 18 provides the user 17 with a maintenance service for the electric motor 21.

An architecture in Embodiment 20 is, the user 17 sided architecture being the same as that in each of Embodiment 17 and 18, that the maintenance tool 50 possessed by the maintenance company 18 includes a maintenance worker position database 58 stored with worker position data for calling up the maintenance worker 87, a maintenance worker invoke program 59 and a mobile telephone oriented Web server 61 for displaying the maintenance procedures on a mobile telephone 86 having the Web functions, and the maintenance tool 50 is connected to the maintenance worker 87 in the maintenance company, to be more specific, connected to the Web-function-added mobile telephone 86 possessed by the maintenance worker 87 of the maintenance company via the router 57, the telephone line 73, the mobile telephone network 77 and the mobile telephone base station 76.

The following is an explanation of an operation in Embodiment 20. The electric motor 21 is diagnosed by the maintenance tool 50 possessed by the maintenance company 18. If something abnormal occurs in the diagnosed result, the maintenance worker 87b in the maintenance company 18 who exists closest to the electric motor 21 is invoked by the maintenance tool 50 through the mobile telephone 87b with the Web functions. The maintenance worker 86b in the maintenance company 18 obtains the maintenance procedures corresponding to the state of the electric motor 21 by accessing the maintenance tool 50, and performs the maintenance of the electric motor 21 in accordance with the maintenance procedures.

As explained above, according to the state-of-device remote monitor system in Embodiment 20, the maintenance company 18 is entrusted with the maintenance of the electric motor 21, and therefore the user 17 has no necessity of stationing the worker at all times who monitors whether the electric motor 21 is abnormal in the case of desiring an unmanned operation in the on-the-spot area 11 even when having no knowledge about the maintenance of the electric motor 21. Consequently, this leads to a reduction in the number of the workers. Further, the maintenance company 18 is able to implement the entrustment-based maintenance of a multiplicity of electric motors 21, and it is therefore possible to effectively utilize the maintenance tool 50 and the maintenance worker 87.

Embodiment 21

Figure 26:
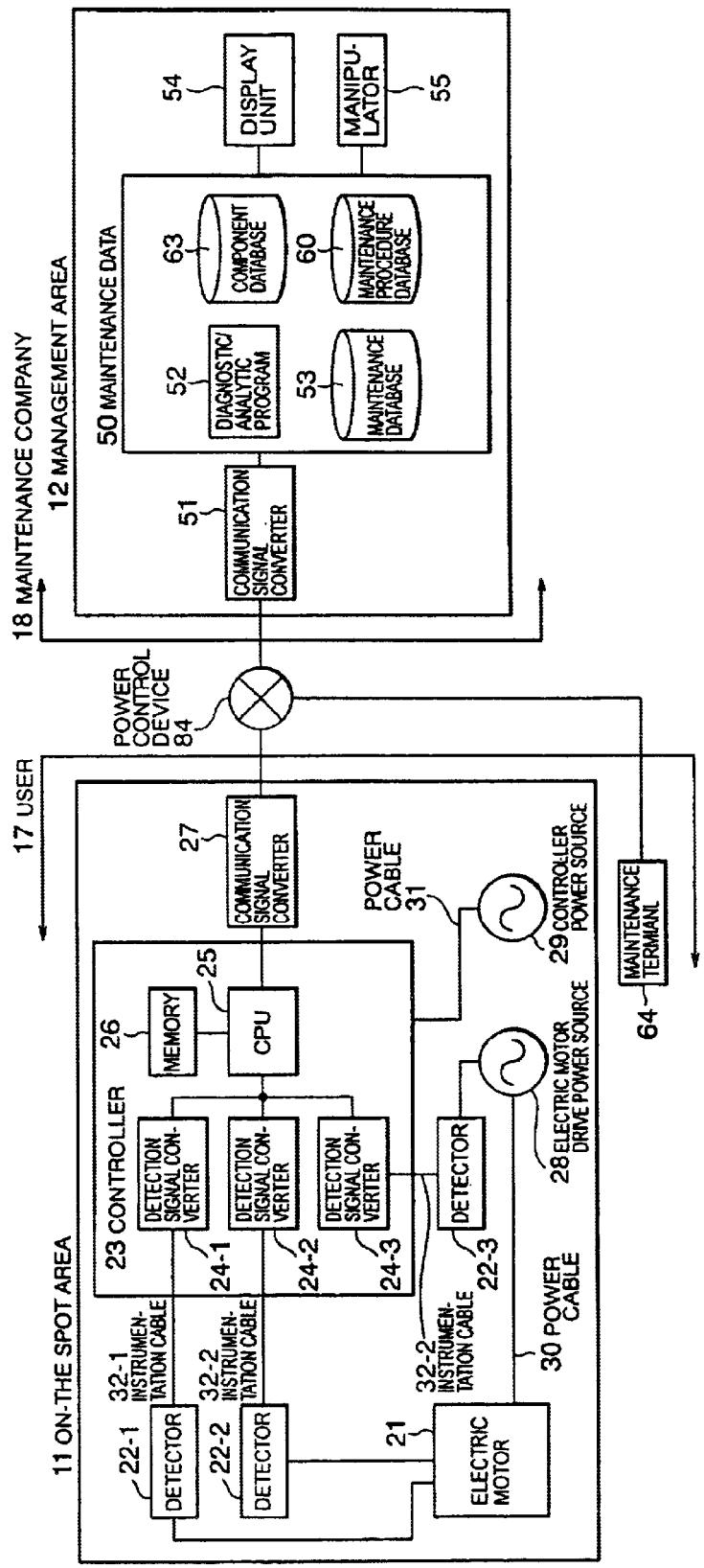
FIG. 26 is a diagram showing an architecture of the state-of-device remote monitor system in Embodiment 21 of the present invention.
Figure 27:
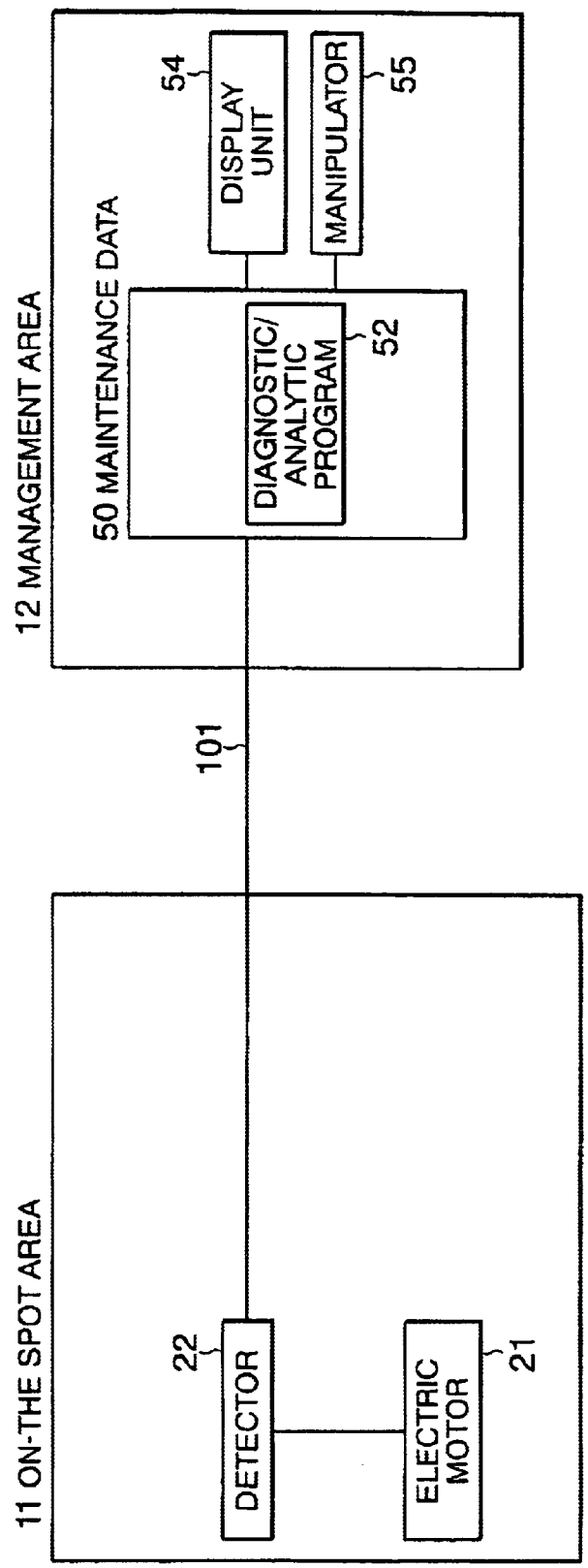
FIG. 27 is a diagram showing an architecture of a conventional state-of-device remote monitor system.

FIG. 26 shows an embodiment different from Embodiments 1 to 20 described above. Each of Embodiments 18 to 20 has exemplified the case in which the alarm is outputted when the electric motor 21 falls into the abnormal state, then the maintenance procedures are provided, and the maintenance is thus conducted. The electric motor 21, however, even when in the normal state, contains the components that need periodic replacements in terms of an integrated operation time and so on. Embodiment 21 is schemed to give ahead the user 17 a proposal that those components be replaced by utilizing the maintenance tool 50.

An architecture in Embodiment 21 is, the user 17 sided architecture being the same as that in Embodiment 17, that the maintenance tool 50 in the maintenance company 18 has an addition of a component database 63 in addition to the software components in Embodiment 17.

Next, an operation in Embodiment 21 will be explained. The data about the operating states of the electric motor 21 are accumulated in the maintenance tool 50 possessed by the maintenance company 18, and hence, when the integrated operating time of the electric motor 21 reaches a fixed time, after being compared with the component database 63, the user 17 is given a proposal that the component concerned be replaced.

Note that the components of the electric motor 21, which require the periodic replacements, may be a lubricating oil and bearings. In the case of the electric motor 21 using the lubricating oil that needs, for instance, a 6-month cycle replacement in terms of the operating time, if the electric motor continues to operate for 12 hours a day, it follows that a 12-month replacement is needed. The maintenance tool 50 displays, several days before the due replacement on the display unit 54, a piece of information that a lubricating oil replacement time of the electric motor 21 comes soon. The maintenance company 18 thus gives the lubricating oil replacement proposal to the user 17. The proposal may be displayed on the maintenance terminal 64 possessed by the user 17.

As discussed above, according to the state-of-device remote monitor system in Embodiment 21, the user 17 can entrust the maintenance company 18 with the management of the electric motor 21 at the normal time as well as with the management thereof at the abnormal time. It is therefore possible to reduce the number of the workers on the side of the user 17 and replace the components at the necessary time by monitoring the state of the electric motor 21. Hence, the electric motor 21 can be kept in the good condition.

As described above, the state-of-device remote monitor system according to the present invention includes the first communication signal converter for converting the detection data obtained by the detection of the detector into the communication signals in the communicable format, and the second communication signal converter for converting the signal data into the detection data before being converted by the first communication signal converter, thereby making it possible to apply the general-purpose communication network as a transmission network for transmitting the detection data and to actualize the state-of-device remote monitor system easy to introduce the equipment.

Further, the it is easy to introduce the equipment by applying the general-purpose network as the transmission network for transmitting the detection data.

The first communication signal converter converts the detection data consisting of the data about the device state detected by the detector into the communicable radio signal and transmits these signal. The second communication signal converter converts the radio signals received from the first communication signal converter into the detection data. Hence, there is neither the necessity of extending the cable for monitoring the state of the device nor the necessity for other routes particularly as the transmission network. Therefore, the maintenance for such routes is not required, so that the state-of-device remote monitor system exhibiting the high maintainability and the high cost-performance can be actualized.

Further, the on-the-spot area connected via the mobile communication device to the management area, whereby the states of the electric motors installed in the plurality of places within the one management area can be monitored.

Moreover, the system includes the power line for supplying the electric power from the power source device to the electric device, and connecting unit for connecting the power line, the controller and the first communication signal converter to each other, whereby the signals can be transmitted without extending the new instrumentation cable for transmitting the detection data. This results in a large decrease in the extension of the cable.

The electric power of the power source for operating the controller is supplied via the power cable for supplying the electric power to the electric motor, and hence the system can be rationally configured with no necessity of extending the new power cable.

Further, the state of the electric motor mounted in the moving train is monitored, so that there is less ever-transmitting possibility of the data. Accordingly, the data obtained by the plurality of detecting operations are stored. Then, the system can be configured at a low cast by utilizing the train radio for the traffic schedule that is mounted in the train.

Moreover, the state of the electric motor mounted in the moving automobile is monitored, so that there is less ever-transmitting possibility of the data. Accordingly, the data obtained by the plurality of detecting operations are stored. The detection data stored in the memory are downloaded into the mobile record terminal by connecting the connectable/disconnectable communication cable. The mobile communication device converts the downloaded detection data to the radio signal and transmits it, whereby the maintenance tool can periodically obtain the state of the electric motor mounted in the automobile.

The system is capable of, if the on-the-spot area is within the electric car mounted with the battery for supplying the electric power, transferring the detection data stored in the memory to the maintenance tool with no extra burden upon the user by connecting the power source to the electric car through the cable in order to charge the electric car with the electricity.

Further, in the case of establishing the communication route between the first communication signal converter and the general-purpose network, by outputting the detection data to the first communication signal converter, the controller has no necessity of having the memory for temporarily recording the data, so that the controller installed in the on-the-spot area can be economically manufactured.

The maintenance tool confirms the state of the connection of the communication line, and therefore, unlike the connection from the controller, the maintenance tool can monitor a state of line activity. Accordingly, if there are a multiplicity of controllers, the line activity can be made efficient.

It is possible to monitor the state of the electric motor with the high accuracy because of being able to change the inspection period upon receiving the diagnosed result from the maintenance tool.

Moreover, the diagnosis tool for the electric motor and the maintenance worker invoke tool are combined into the system, whereby the arrival time taken till the maintenance worker arrives at the electric motor since the abnormality has occurred on the electric motor, can be reduced because of no intermediary person other than the maintenance worker.

Further, the maintenance tool, if the diagnosed result of the detection data shows the abnormality, extracts the maintenance procedure data corresponding to the abnormality data from the maintenance procedure database and transmits the same procedure data to the mobile communication device, whereby the maintenance worker is able to perform the maintenance in a way that refers to the mobile communication device. Hence, it is possible to omit the time to go and take the maintenance manual after the abnormality has occurred on the electric motor.

Furthermore, the maintenance company possesses the maintenance tool, with the result that the user has no necessity of performing the maintenance of the maintenance tool. The maintenance company conducts the maintenance works given from a plurality of users and therefore can accumulate a large quantity of state-of-device data, with the result that the company is capable of doing a highly-accurate diagnosis.

Moreover, the user is able to obtain the maintenance procedures of the electric motor and the device data in a way that sees the screen on the maintenance terminal without referring to documents such as an instruction manual and specifications. Therefore, the works on the side of the user can be rationalized, and the maintenance of the electric motor can be promptly conducted.

The maintenance company can be entrusted with the maintenance of the electric motor, and hence there is no necessity of stationing the worker at all times who monitors whether the electric motor is abnormal. This leads to a reduction in the number of the workers. Further, the maintenance company is able to implement the entrustment-based maintenance of a multiplicity of electric motors, and it is therefore possible to effectively utilize the maintenance tool and the maintenance worker.

Further, the maintenance tool includes the device database stored beforehand with the device specifications of the variety of electric devices, and the maintenance procedure database stored beforehand with plural pieces of maintenance procedure data corresponding to the variety of abnormal states. The maintenance worker invoke program calls up the mobile communication device and provides the mobile communication device for the maintenance worker with the device specifications corresponding to the electric device diagnosed abnormal and the maintenance procedures corresponding to the monitor result, whereby the electric motor can be kept in the good condition.

What is claimed is:

1. A state-of-device remote monitoring system comprising:
   an on-the-spot area including:
      an electric device;
      a detector for measuring physical and electrical operating characteristics of said electric device;
      a first communication signal converter for converting detection data obtained by said detector into communication signals, and transmitting the communication signals; and
      a controller, having a memory for storing the detection data obtained by the detection of said detector, for storing with the detection data a device state based on a preset detection start program, and outputting the detection data stored in said memory to said first communication signal converter based on a preset communication start program that runs in correspondence with storage of the detection data, and
   a management area including:
      a second communication signal converter for converting the communication signals received from said first communication signal converter into the detection data;

a maintenance tool having a diagnostic/analytic program for analyzing the device state from the detection data converted by said second communication signal converter, and a maintenance database storing data necessary for analysis by said diagnostic/analytic program and a diagnosed result; and a display unit for displaying the diagnosed result obtained by the analysis by said maintenance tool.

2. The state-of-device remote monitoring system according to claim 1, further comprising a general purpose network for transmitting the communication signals transmitted from said first communication signal converter to said second communication signal converter.

3. The state-of-device remote monitoring system according to claim 2, wherein, if said on-the-spot area is within an automobile, comprising:

a mobile record terminal downloaded with the detection data stored in said memory by connecting a communication cable, disconnectable from and connectable to said first communication signal converter; and a mobile communication device, connected to said mobile record terminal, for converting the detection data downloaded into said mobile record terminal into the radio signals and transmitting the radio signals, wherein said general-purpose network includes at least one base station for receiving and converting the radio signals of said mobile communication device into the communication signals, and including a mobile communication network for transferring the communication signals converted by said base station to a public line network.

4. The state-of-device remote monitor system according to claim 2, wherein said on-the-spot area includes a mobile communication device for transmitting the radio signals based on the communication signals converted by said first communication signal converter, and said general-purpose network includes:
at least one base station for receiving the radio signals of said mobile communication device and converting the radio signals into the communication signals; and
a mobile communication network for transferring the communication signals converted by said base station to a public line network.

5. The state-of-device remote monitoring system according to claim 2, wherein said controller does not include said memory, detects a device state through said detector based on a preset detection start program if a communication route between said first communication signal converter and said general-purpose network is established, and outputs the detection data to said first communication signal converter based on a preset communication start program in accordance with the device state detected.

6. The state-of-device remote monitoring system according to claim 1, wherein said first communication signal converter converts the detection data into radio signals and transmits the radio signals, and said second communication signal converter converts the radio signals received from said first communication signal converter into the detection data.

7. The state-of-device remote monitoring system according to claim 1, wherein when, said on-the-spot area is within a train including a train radio device for adjusting a traffic schedule, the detection data stored in said memory are wirelessly transmitted to said second communication signal converter from said train radio device by use of said train radio device as said first communication signal converter.

8. The state-of-device remote monitoring system according to claim 1, further comprising:

a power line for supplying said electric device with electric power from a power source device; and connecting means for connecting said power line, said controller, and said first communication signal converter to each other, said controller transmitting the detection data to said first communication signal converter via said connecting means and said power line.

9. The state-of-device remote monitoring system according to claim 8, further comprising:

a current transformer, provided on said power line, for taking an electric current in a non-contact manner from said power line; and a power source circuit for supplying the electric power to said controller based on the current taken by said current transformer.

10. The state-of-device remote monitoring system according to claim 1, wherein, when said on-the-spot area is within an electric car including a battery for supplying electric power, the system comprises:

a power source/communication cable disconnectable from and connectable to said battery, connected to a power source; and a power control device for charging said battery with electricity from said power source device by connecting said power source/communication cable to said battery, downloading the detection data stored in said memory, and transferring the detection data to said general-purpose network.

11. The state-of-device remote monitoring system according to claim 1, wherein said maintenance tool outputs a state-of-device detection start command of the electric device to said controller at a predetermined time, and said controller executes the detection start program based on the state-of-device detection start command.

12. The state-of-device remote monitoring system according to claim 1, wherein if said controller detects the device state through said detector with a fixed period, said maintenance tool outputs to said controller a command to change detection period of said detector in accordance with a diagnosed result from the detection data, based on a preset program, and said controller detects the detection data from said detector with the detection period changed, based on the command to change the detection period.

13. The state-of-device remote monitoring system according to claim 1, further comprising a mobile communication device for issuing abnormality information upon receiving the abnormality information, wherein said maintenance tool transmits, if the diagnosed result from the detection data shows an abnormality, the abnormality information to said mobile communication device.

14. The state-of-device remote monitoring system according to claim 13, wherein said maintenance tool includes a maintenance procedure database storing maintenance procedure data corresponding to a variety of abnormal states, extracts the maintenance procedure data corresponding to the abnormal information from said maintenance procedure database if the diagnosed result from the detection data shows the abnormality, and transmits the extracted maintenance procedure data together with the abnormality information to said mobile communication device.

15. The state-of-device remote monitoring system according to claim 1, further comprising a user maintenance terminal connected to said general-purpose network and issuing the data received via said general-purpose network, wherein said maintenance tool is managed by an in-charge-of-maintenance company in charge of monitoring device state of the electric device and outputting the diagnosed result, based on said diagnostic/analytic program, to said maintenance terminal.

16. The state-of-device remote monitoring system according to claim 15, wherein said maintenance tool includes a device database storing device specifications of a variety of electric devices, and a maintenance procedure database storing maintenance procedure data corresponding to a variety of abnormal states, and outputs to said maintenance terminal the device specification corresponding to an electric device analyzed and the maintenance procedure data corresponding to the diagnosed result together with the diagnosed result based on said diagnostic/analytic program.

17. The state-of-device remote monitoring system according to claim 15, wherein said mobile communication device is possessed by a maintenance worker of the in-charge-of-maintenance company in charge of monitoring the device state of the electric device, said maintenance tool is managed by the in-charge-of-maintenance company and includes:

a position database storing position of said mobile communication device; and a maintenance worker invoked program for extracting, if the diagnosed result based on said diagnostic/analytic program shows the abnormality, said mobile communication device closest in position to the electric device diagnosed as abnormal, based on said position database, and calling said mobile communication device.

18. The state-of-device remote monitoring system according to claim 17, wherein said maintenance tool includes a device database storing device specifications of a variety of electric devices, and a maintenance procedure database storing plural items of maintenance procedure data corresponding to a variety of abnormal states, and said maintenance worker invoked program calls said mobile communication device and provides said mobile communication device for the maintenance worker with the device specifications corresponding to the electric device diagnosed abnormal and the maintenance procedure data corresponding to the abnormal state.

19. The state-of-device remote monitoring system according to claim 1, wherein the physical and electrical operating characteristics include temperature, vibration, current, and voltage of the electrical device.

* * * * *